US012046178B2

(12) United States Patent
Nose et al.

(10) Patent No.: US 12,046,178 B2
(45) Date of Patent: Jul. 23, 2024

(54) DEVICE AND METHOD FOR DISPLAY BRIGHTNESS CONTROL

(71) Applicant: Synaptics Incorporated, San Jose, CA (US)

(72) Inventors: Takashi Nose, Kanagawa (JP); Hirobumi Furihata, Tokyo (JP); Masao Orio, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/342,078

(22) Filed: Jun. 27, 2023

(65) Prior Publication Data

US 2023/0343263 A1 Oct. 26, 2023

Related U.S. Application Data

(62) Division of application No. 17/505,550, filed on Oct. 19, 2021, now Pat. No. 11,727,843.

(51) Int. Cl.
*G09G 3/20* (2006.01)

(52) U.S. Cl.
CPC ....... *G09G 3/20* (2013.01); *G09G 2310/0243* (2013.01); *G09G 2320/0626* (2013.01); *G09G 2320/0673* (2013.01); *G09G 2320/0686* (2013.01)

(58) Field of Classification Search
CPC ... G09G 2310/0232; G09G 2310/0243; G09G 2320/0626; G09G 2320/0673; G09G 2320/068; G09G 2320/0686; G09G 2380/02; G09G 3/035; G09G 3/20
See application file for complete search history.

(56) References Cited

U.S. PATENT DOCUMENTS

2006/0279481 A1 12/2006 Haruna et al.
2014/0146090 A1 5/2014 Oh et al.
2014/0340431 A1 11/2014 Yamakawa
2016/0042707 A1 2/2016 Wang et al.
2016/0050402 A1 * 2/2016 Jeong ........................ H04N 9/69 348/674
2019/0130844 A1 5/2019 Yang et al.
2020/0193937 A1 6/2020 Tsai et al.
2020/0234634 A1 7/2020 Li
2022/0223081 A1 7/2022 Furihata

* cited by examiner

*Primary Examiner* — Kenneth Bukowski
(74) *Attorney, Agent, or Firm* — Leydig, Voit & Mayer, Ltd.

(57) ABSTRACT

A display driver includes image processing circuitry and drive circuitry. The image processing circuitry is configured to generate first voltage data for a first pixel in a first screen area of a display panel using a first gamma parameter. The image processing circuitry is further configured to generate second voltage data for a second pixel in a second screen area of the display panel using a second gamma parameter set. The image processing circuitry is further configured to determine an interpolated gamma parameter set for a third pixel in a connection area of the display panel through interpolation between the first gamma parameter set and the second gamma parameter set. The connection area is disposed between the first screen area and the second screen area. The image processing circuitry is further configured to generate third voltage data for the third pixel using the interpolated gamma parameter set.

15 Claims, 18 Drawing Sheets

DEVICE AND METHOD FOR DISPLAY BRIGHTNESS CONTROL

CROSS-REFERENCE TO RELATED APPLICATIONS

This patent application is a divisional of U.S. patent application Ser. No. 17/505,550, filed Oct. 19, 2021, which is incorporated by reference herein in its entirety.

FIELD

The disclosed technology generally relates to display brightness control for display systems.

BACKGROUND

Display systems may be configured to segment a display panel into multiple screen areas and use the multiple screen areas for different uses. In some implementations, for example, a first screen area of the display panel may be used for displaying main contents (e.g., still images, moving images, graphics, and other illustrations) and a second screen area of the display panel may be used for providing an interactive graphical user interface. In other implementations, a first screen area of the display panel may be used by a first application program and a second screen area of the display panel may be used by a second application program.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, a display driver is provided. The display driver includes image processing circuitry and drive circuitry. The image processing circuitry is configured to generate first voltage data for a first pixel in a first screen area of a display panel using a first gamma parameter set that defines a first gamma curve for the first screen area. The image processing circuitry is further configured to generate second voltage data for a second pixel in a second screen area of the display panel using a second gamma parameter set that defines a second gamma curve for the second screen area. The image processing circuitry is further configured to determine an interpolated gamma parameter set for a third pixel in a connection area of the display panel through interpolation between the first gamma parameter set and the second gamma parameter set. The connection area is disposed between the first screen area and the second screen area. The image processing circuitry is further configured to generate third voltage data for the third pixel using the interpolated gamma parameter set. The drive circuitry is configured to update the first pixel in the first screen area based on the first voltage data, update the second pixel in the second screen area based on the second voltage data, and update the third pixel in the connection area based on the third voltage data.

In one or more embodiments, a display device is provided. The display device includes a display panel and a display driver. The display panel includes a first screen area, a second screen area, and a connection area disposed between the first screen area and the second screen area. The display driver is configured to generate first voltage data for a first pixel in the first screen area using a first gamma parameter set that defines a first gamma curve for the first screen area. The display driver is further configured to generate second voltage data for a second pixel in the second screen area using a second gamma parameter set that defines a second gamma curve for the second screen area. The display driver is further configured to determine an interpolated gamma parameter set for the connection area through interpolation between the first gamma parameter set and the second gamma parameter set and generate third voltage data for a third pixel in the connection area using the interpolated gamma parameter set. The display driver is further configured to update the first pixel in the first screen area based on the first voltage data, update the second pixel in the second screen area based on the second voltage data, and update the third pixel in the connection area based on the third voltage data.

In one or more embodiments, a method for driving a display panel is provided. The method includes generating first voltage data for a first pixel in a first screen area of a display panel using a first gamma parameter set that defines a first gamma curve for the first screen area. The method further includes generating second voltage data for a second pixel in a second screen area of the display panel using a second gamma parameter set that defines a second gamma curve for the second screen area. The method further includes determining an interpolated gamma parameter set for a connection area of the display panel through interpolation between the first gamma parameter set and the second gamma parameter set. The connection area is disposed between the first screen area and the second screen area. The method further includes generating third voltage data for a third pixel in the connection area using the interpolated gamma parameter set. The method further includes updating the first pixel in the first screen area based on the first voltage data, updating the second pixel in the second screen area based on the second voltage data, and updating the third pixel in the connection area based on the third voltage data.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1A:
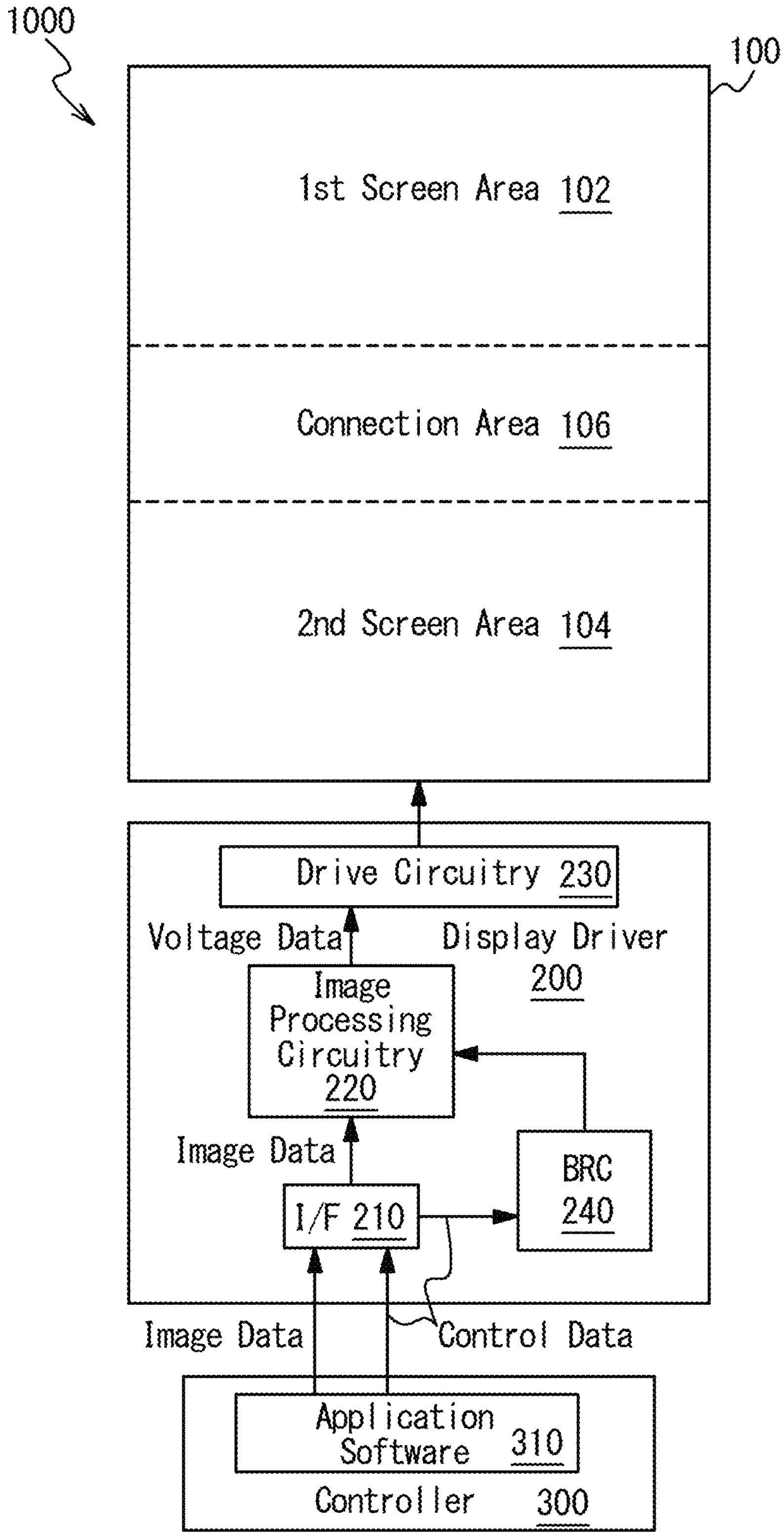
FIG. 1A illustrates an example configuration of a display system, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Display systems (e.g., incorporated in smartphones, cell phones, tablets, and other portable electronic devices) may be configured to dynamically segment a display panel into multiple screen areas and use the multiple screen areas for different uses. In some implementations, a first screen area of the display panel may be used to display main contents (e.g., still images, moving images, graphics, and other illustrations) and a second screen area of the display panel may be used to provide an interactive graphical user interface (e.g., software keyboards, menus and other navigation elements). In other implementations, a first screen area of the display panel may be used by first application software and a second screen area of the display panel may be used by second application software. In still other implementations, the display panel may be configured such that the display panel is foldable at the boundary between the first screen area and the second screen area, and different images or portions of the same image may be displayed in the first screen area and the second screen area.

To provide improved user experiences, a portable electronic device may be configured to individually adjust the brightness levels of the respective screen areas. The portable electronic device may be configured to adjust the brightness levels of the first and second screen areas to be different from each other. In some embodiments, the portable electronic device may be configured to adjust the brightness level of the first screen to be suitable for the main contents and adjust the brightness level of the second screen area to be suitable for the interactive graphical user interface. Since a wide variety of contents are displayed on the display panel, it would be advantageous if the definitions and/or brightness levels of the screen areas can be flexibly adjusted or modified. Further, different brightness levels of adjacent screen areas may cause a visually-perceivable artifact at the boundary between the adjacent screen areas. It would also be advantageous if the artifact potentially caused by brightness levels is mitigated.

The present disclosure provides various technologies for flexibly adjusting the definitions and/or brightness levels of the screen areas and/or for mitigating the visually-perceivable artifact at the boundary between the adjacent screen areas. In one or more embodiments, a display driver includes image processing circuitry and drive circuitry. The image processing circuitry is configured to generate first voltage data for a first pixel in a first screen area of a display panel using a first gamma parameter set that defines a first gamma curve for the first screen area and generate second voltage data for a second pixel in a second screen area of the display panel using a second gamma parameter set that defines a second gamma curve for the second screen area. The image processing circuitry is further configured to determine an interpolated gamma parameter set for a third pixel in a connection area of the display panel through interpolation between the first gamma parameter set and the second gamma parameter set. The connection area is disposed between the first screen area and the second screen area. The image processing circuitry is further configured to generate third voltage data for the third pixel using the interpolated gamma parameter set. The drive circuitry is configured to update the first pixel in the first screen area based on the first voltage data, update the second pixel in the second screen area based on the second voltage data, and update the third pixel in the connection area based on the third voltage data. The use of the first gamma parameter set and the second gamma parameter set may offer individual and flexible brightness controls for the first screen area and the second gamma parameter set. Further, the use of the interpolated gamma parameter set for the connection area effectively suppresses occurrence of an artifact.

FIG. 1A illustrates an example configuration of a display system 1000, according to one or more embodiments. In the illustrated embodiment, the display system 1000 includes a display panel 100, a display driver 200, and a controller 300 that is external to the display driver 200. Examples of the display panel 100 may include an organic light emitting diode (OLED) display, a micro light emitting diode (LED)

display, and a liquid crystal display (LCD) panel. The display driver 200 is configured to update the display panel 100 based on image data received from the controller 300. The image data may include pixel data for respective pixels of the display panel 100. Pixel data for a pixel may include a gray level of the pixel.

The controller 300 is configured to generate and provide the image data to the display driver 200. The controller 300 may be further configured to generate and provide control data to the display driver 200. The control data may control the display driver 200. In one implementation, the control data may include a display brightness value (DBV). The DBV may be a user brightness setting that specifies a desired display brightness level of the display panel 100. The display brightness level may correspond to the brightness of the entire image displayed on the display panel 100. The DBV may be generated based on a user operation. For example, when an instruction to adjust the brightness of an image displayed on the display panel 100 is manually input to an input device (not illustrated), the controller 300 may generate the DBV based on this instruction to adjust the display brightness level. The input device may include a touch panel disposed on at least a portion of the display panel 100, a cursor control device, and mechanical and/or non-mechanical buttons.

The controller 300 may be installed with application software 310. The application software 310 may be configured to generate the image data and/or the control data. In some embodiments, the control data may include one or more application commands issued by the application software 310. An application command may instruct the display driver 200 to perform a specified operation, e.g., display of an application-related image stored in the display driver 200. Details of application commands will be described later in detail.

In the illustrated embodiment, the display driver 200 includes interface (I/F) circuitry 210, image processing circuitry 220, drive circuitry 230, and brightness control circuitry (BRC) 240. The interface circuitry 210 is configured to receive the image data and the control data from the controller 300. The interface circuitry 210 is further configured to forward the image data to the image processing circuitry 220 and forward the control data to the BRC 240. In other embodiments, the interface circuitry 210 may be configured to process the image data and send the processed image data to the image processing circuitry 220.

In one or more embodiments, the image processing circuitry 220 is configured to process the image data received from the interface circuitry 210 to generate voltage data. The voltage data may include voltage levels of drive voltages with which the respective pixels in the display panel 100 are to be programmed or updated. The processing performed by the image processing circuitry 220 may include a gamma transformation to convert gray levels to voltage levels of the voltage data. The processing performed by the image processing circuitry 220 may further include one or more other processes (e.g., color adjustment, image scaling, etc.), which may be implemented before and/or after the gamma transformation. Details of the gamma transformation will be described later in detail.

The drive circuitry 230 is configured to receive the voltage data received from the image processing circuitry 220. The drive circuitry 230 is further configured to generate, based on the voltage data, drive voltages with which the respective pixels of the display panel 100 are updated.

The BRC 240 is configured to control of the brightness of the image displayed on the display panel 100 based on the control data received from the controller 300. In embodiments where the control data includes the DBV, which may specify a desired display brightness level of the display panel 100, the BRC 240 may be configured to control the brightness of the displayed image based on the DBV.

In various embodiments, the display driver 200 may be configured to define multiple screen areas for the display panel 100 and individually control the brightness levels of the screen areas. The display driver 200 may be further configured to define one or more connection areas disposed between adjacent screen areas and control the brightness levels of the connection areas. In the embodiment illustrated in FIG. 1, the display panel 100 is segmented into a first screen area 102, a second screen area 104, and a connection area 106 disposed between the first screen area 102 and the second screen area 104. The first screen area 102, the connection area 106, and the second screen area 104 are arrayed in the vertical direction of the display panel 100.

Figure 1B:
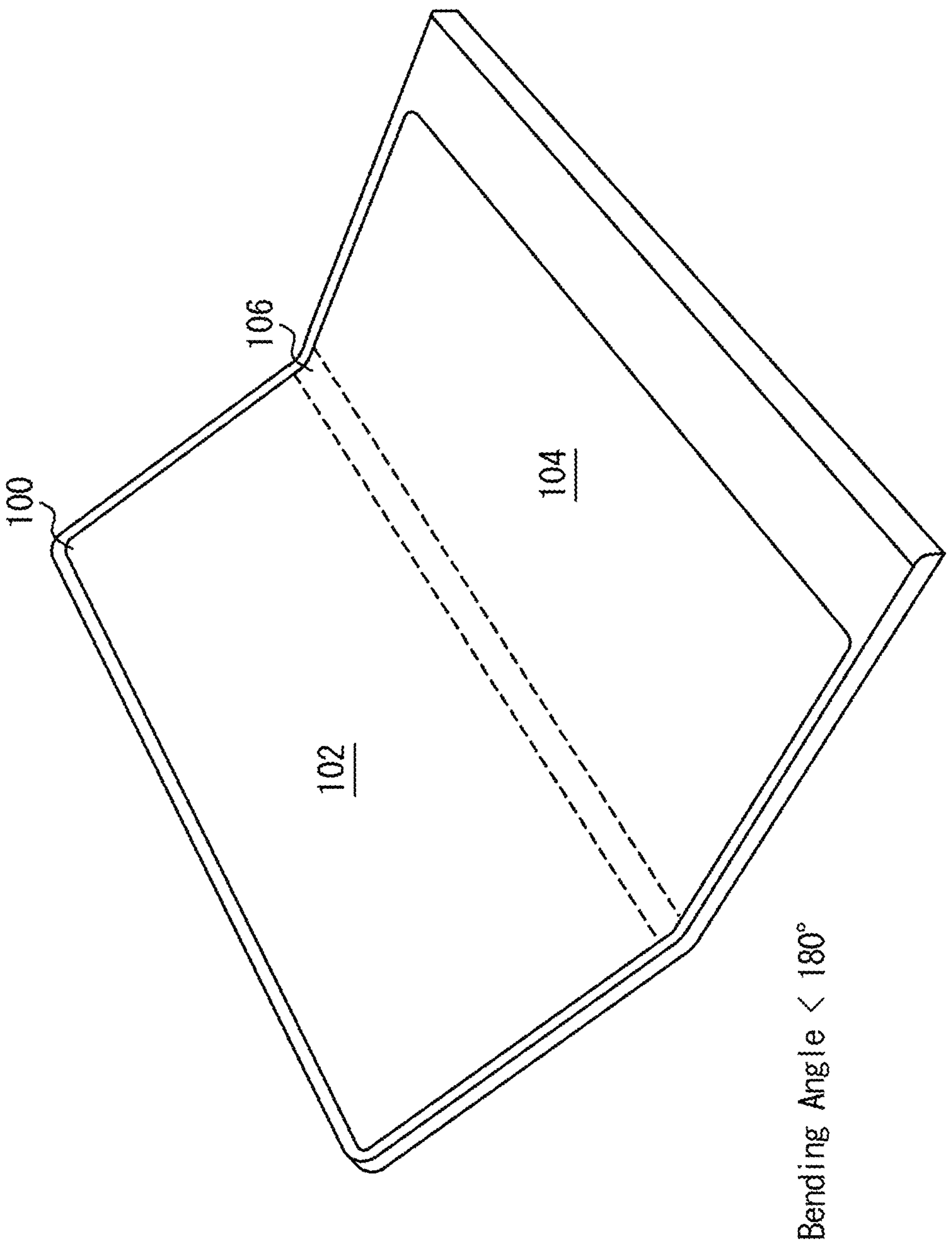
FIG. 1B illustrates an example configuration of a display panel, according to one or more embodiments.
Figure 1C:
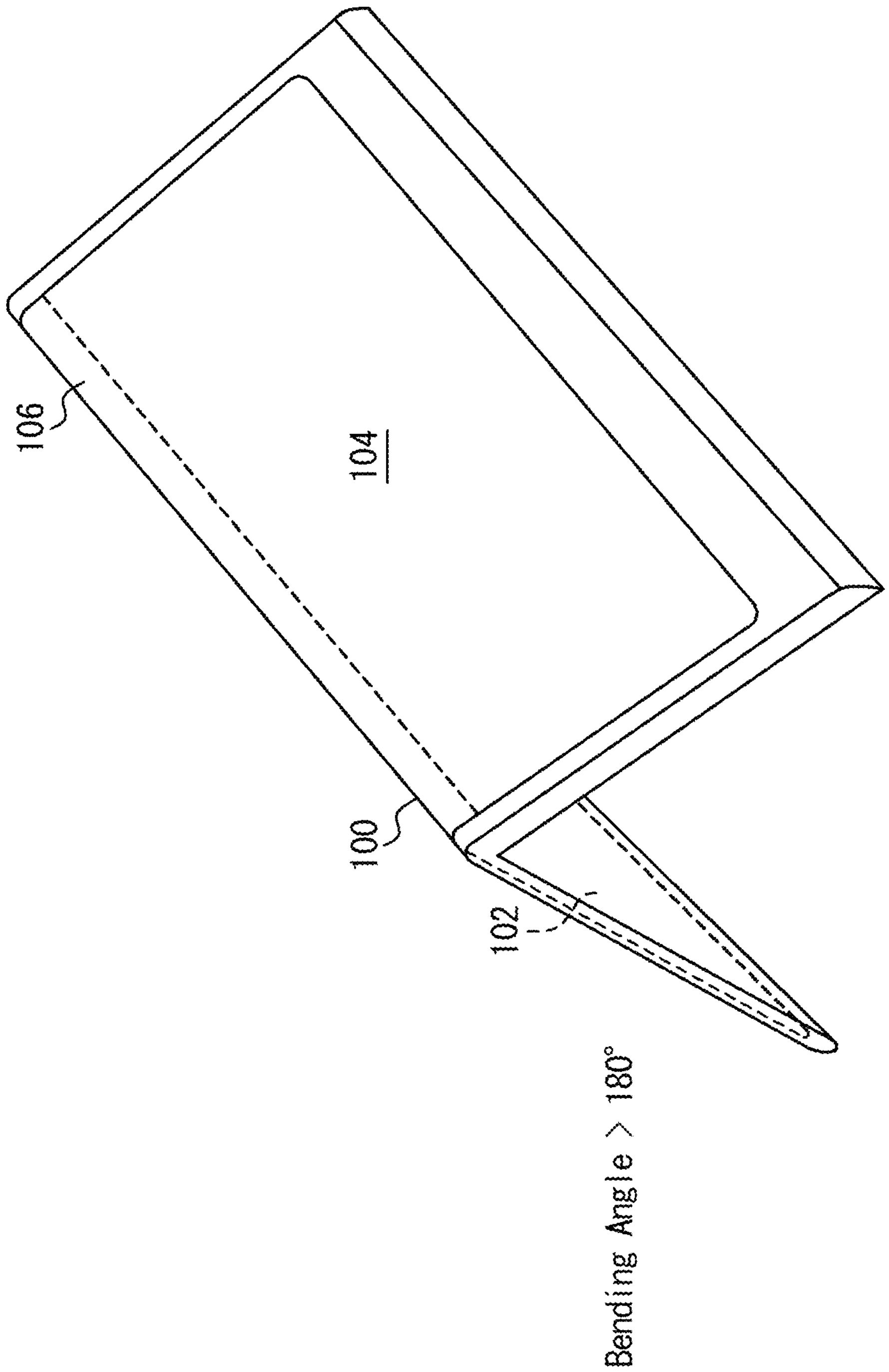
FIG. 1C illustrates an example configuration of a display panel, according to one or more embodiments.

In some embodiments, the display panel 100 may be able to be bent as illustrated in FIG. 1B. In some embodiments, the display panel 100 may include a flexible portion that can be bent and may be foldable at the flexible portion. The display driver 200 (not illustrated in FIG. 1B) may be configured to define the connection area 106 to include the flexible portion. The foldable feature of the display panel 100 may make the angle between the first screen area 102 and the second screen area 104 adjustable. The angle between the first screen area 102 and the second screen area 104 may be hereinafter referred to as bending angle. The bending angle is 180° when the display panel 100 is flat and 0° when the display panel 100 is completely folded such that the first screen area 102 and the second screen area 104 face each other (e.g., the first screen area 102 and the second screen area 104 is almost in contact). In some embodiments, as illustrated in FIG. 1C, the display panel 100 may be able to be bent backwards such that the first screen area 102 and the second screen area 104 are directed outward. It is noted that the first screen area 102 is indicated by the broken line in FIG. 1C as the first screen area 102 is located behind the housing. In this case, the bending angle is between 180° and 360°. The bending angle is 360° when the that first screen area 102 and the second screen area 104 are directed in opposite outward directions.

Figure 2:
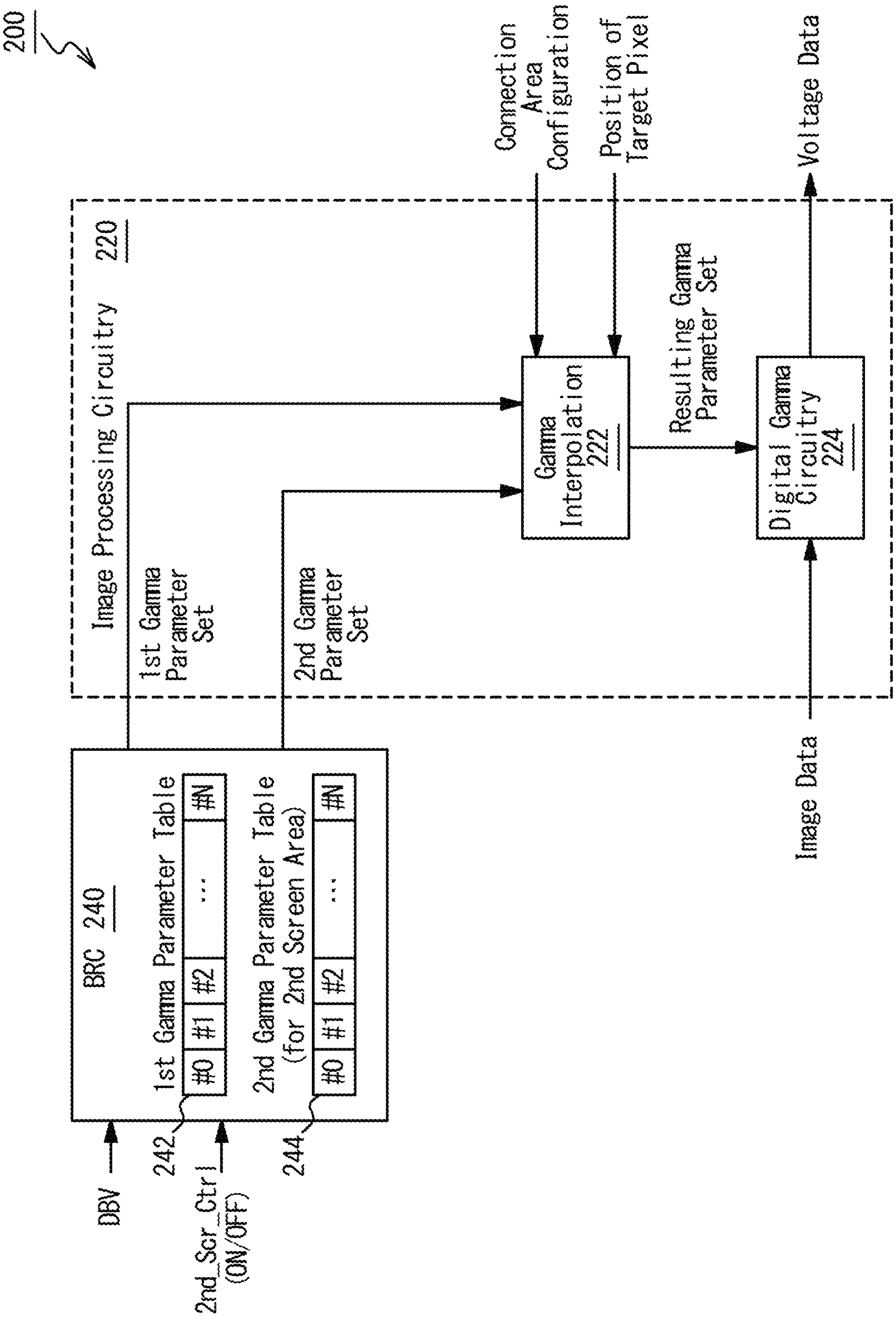
FIG. 2 illustrates an example partial configuration of a display driver, according to one or more embodiments.

FIG. 2 illustrates an example partial configuration of the display driver 200, according to one or more embodiments. In the illustrated embodiment, the BRC 240 is configured to provide a first gamma parameter set and a second gamma parameter set to the image processing circuitry 220. The first gamma parameter set includes a set of gamma parameters that define a first gamma curve for the first screen area 102, and the second gamma parameter set includes a set of gamma parameters that define a second gamma curve for the second screen area 104. The gamma curve referred herein is a curve that defines the correlation between gray levels of the image data and voltage levels of the voltage data in performing the gamma transformation. Voltage data for the pixels in the first screen area 102 are generated in accordance with the first gamma curve, and voltage data for the pixels in the second screen area 104 are generated in accordance with the second gamma curve. In various embodiments, the brightness level of the first screen area 102 is adjusted by the first gamma curve (which is defined by the first gamma parameter set) and the brightness level of the second screen area 104 is adjusted by the second gamma curve (which is defined by the second gamma parameter set).

Figure 3:
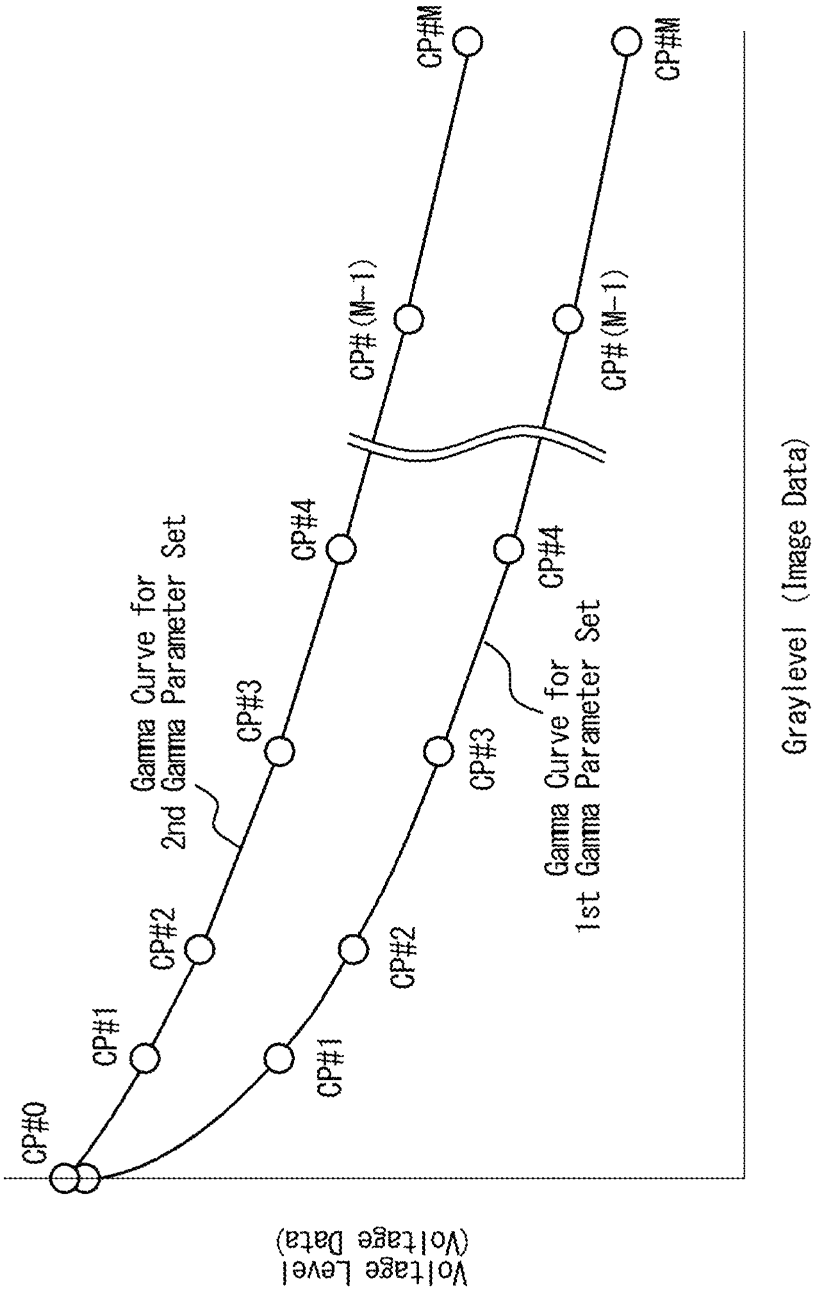
FIG. 3 illustrates example definitions of the first gamma curve and the second gamma curve, according to one or more embodiments.

FIG. 3 illustrates example definitions of the first gamma curve and the second gamma curve, according to one or more embodiments. In the illustrated embodiment, each of the first gamma curve and the second gamma curve is a free-form curve (e.g., a Bezier curve) defined by control points #0 to #M. Each of the first gamma parameter set and the second gamma parameter set may include coordinates of the control points #0 to #M in a coordinate system defined with a first coordinate axis (the horizontal axis in FIG. 3) that represents gray levels and a second coordinate axis (the vertical axis in FIG. 3) that represents voltage levels.

Referring back to FIG. 2, the BRC 240 includes a first gamma parameter table 242 and a second gamma parameter table 244. The term "table" refers to any storage mechanism that relates sets of values. The group of gamma parameter tables may be a single storage structure or multiple structures. Each of the first gamma parameter table 242 and the second gamma parameter table 244 contains a plurality of gamma parameter sets, denoted by "#0" to "#N" in FIG. 2, which define different gamma curves. It is noted that the gamma parameter set #i of the first gamma parameter table 242 and the gamma parameter set #i of the second gamma parameter table 244 may be different from each other, where i is an integer from 0 to N. Each of the first gamma parameter table 242 and the second gamma parameter table 244 relates the gamma parameter sets to DBVs.

The BRC 240 is configured to determine the first gamma parameter set based on the first gamma parameter table 242 and the DBV. In some embodiments, the BRC 240 is configured to select the first gamma parameter set from the gamma parameter sets #0 to #N of the first gamma parameter table 242 based on the DBV. In one implementation, DBV ranges #0 to #N are defined by segmenting the entire range of possible DBVs (also see FIG. 4A), and the BRC 240 may be configured to select the gamma parameter set #i of the first gamma parameter table 242 as the first gamma parameter set when the DBV is in the DBV range #i.

The BRC 240 is further configured to determine the second gamma parameter set based on the second gamma parameter table 244, the DBV, and a second screen area brightness control instruction 2nd_Scr_Ctrl. The second screen area brightness control instruction 2nd_Scr_Ctrl may instruct the BRC 240 whether or not to individually control the brightness levels of the first screen area 102 and the second screen area 104. The second screen area brightness control instruction 2nd_Scr_Ctrl may be received from the controller 300 as part of the control data. In various embodiments, the BRC 240 may be configured to select the second gamma parameter set from the gamma parameter sets #0 to #N of the second gamma parameter table 244 based on the DBV in response to activation of the second screen area brightness control instruction 2nd_Scr_Ctrl. By selecting the second gamma parameter set from the second gamma parameter table 244, the brightness level of the second screen area 104 is controlled independently of the brightness level of the first screen area 102. In one implementation, the BRC 240 may be configured to select the gamma parameter set #i of the second gamma parameter table 244 as the second gamma parameter set when the DBV is in the DBV range #i. The BRC 240 may be further configured to determine the second gamma parameter set to be the same as the first gamma parameter set in response to deactivation of the second screen area brightness control instruction 2nd_Scr_Ctrl. By determining the second gamma parameter set to be the same as the first gamma parameter set, the brightness levels of the first and second screen areas 102 and 104 are controlled to be equal to each other, resulting in that the brightness level of the entire display panel 100 is controlled by the first gamma parameter set. The first gamma parameter set and the second gamma parameter set are provided to the image processing circuitry 220.

In the illustrated embodiment, the image processing circuitry 220 includes gamma interpolation circuitry 222 and digital gamma circuitry 224. The gamma interpolation circuitry 222 is configured to determine a resulting gamma parameter set based on the first gamma parameter set, the second gamma parameter set, and the position of a target pixel for which the gamma transformation is to be performed. In one implementation, the gamma interpolation circuitry 222 is configured to select the first gamma parameter set as the resulting gamma parameter set when the target pixel is located in the first screen area 102 and select the second gamma parameter set as the resulting gamma parameter set when the target pixel is located in the second screen area 104. The gamma interpolation circuitry 222 is further configured to determine the resulting gamma parameter set as an interpolated gamma parameter set generated through interpolation of the first gamma parameter set and the second gamma parameter set when the target pixel is located in the connection area 106.

Figure 4A:
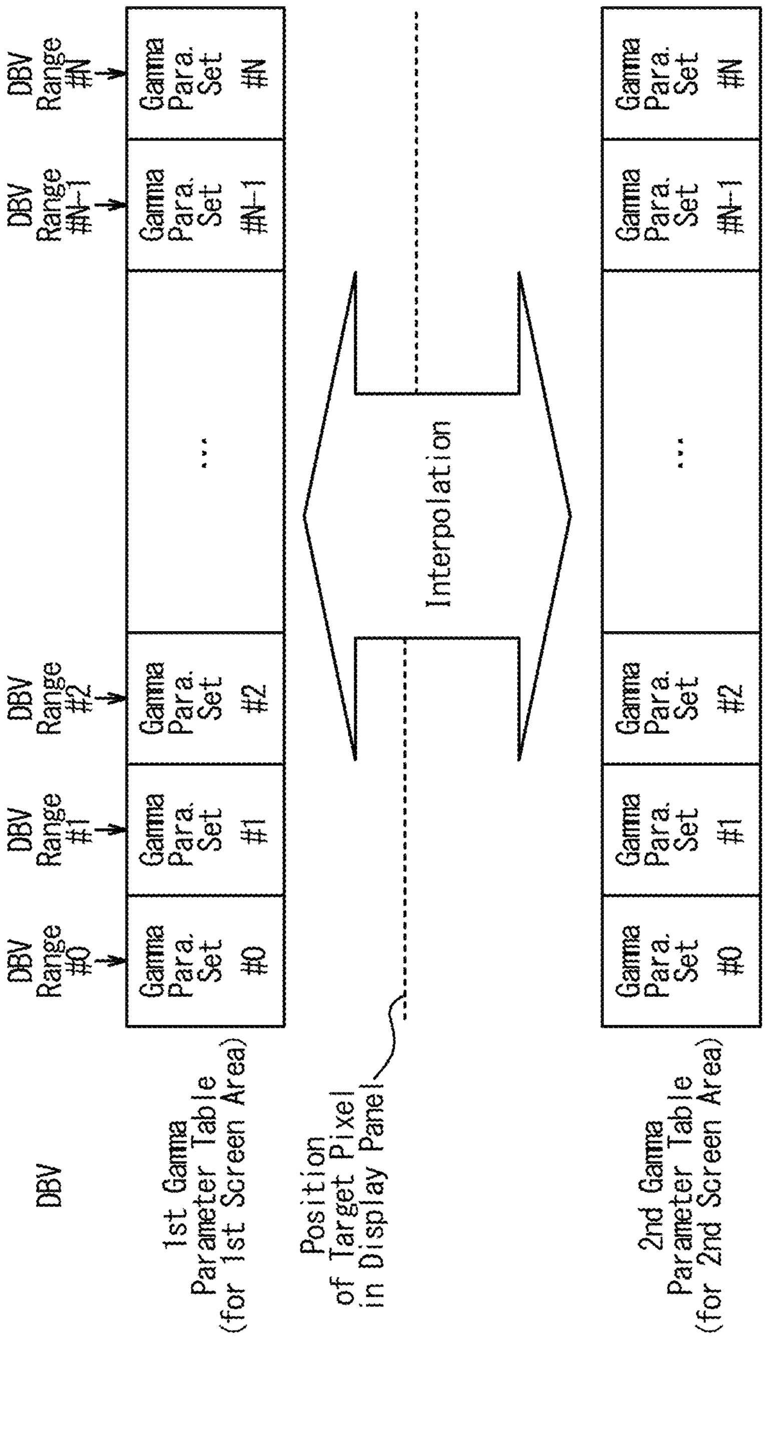
FIG. 4A illustrates an example selection of a first gamma parameter set and a second gamma parameter set and an example interpolation of the first gamma parameter set and the second gamma parameter set, according to one or more embodiments.

FIG. 4A illustrates an example selection of the first gamma parameter set and the second gamma parameter set and an example interpolation of the first gamma parameter set and the second gamma parameter set, according to one or more embodiment. In the illustrated embodiment, when the DBV is in the DBV range #i, the gamma parameter set #i of the first gamma parameter table 242 (also see FIG. 2) is selected as the first gamma parameter set, and the gamma parameter set #i of the second gamma parameter table 244 is selected as the second gamma parameter set. The interpolated gamma parameter set is determined through interpolation of the first gamma parameter set and the second gamma parameter set based on the position of the target pixel.

Figure 4B:
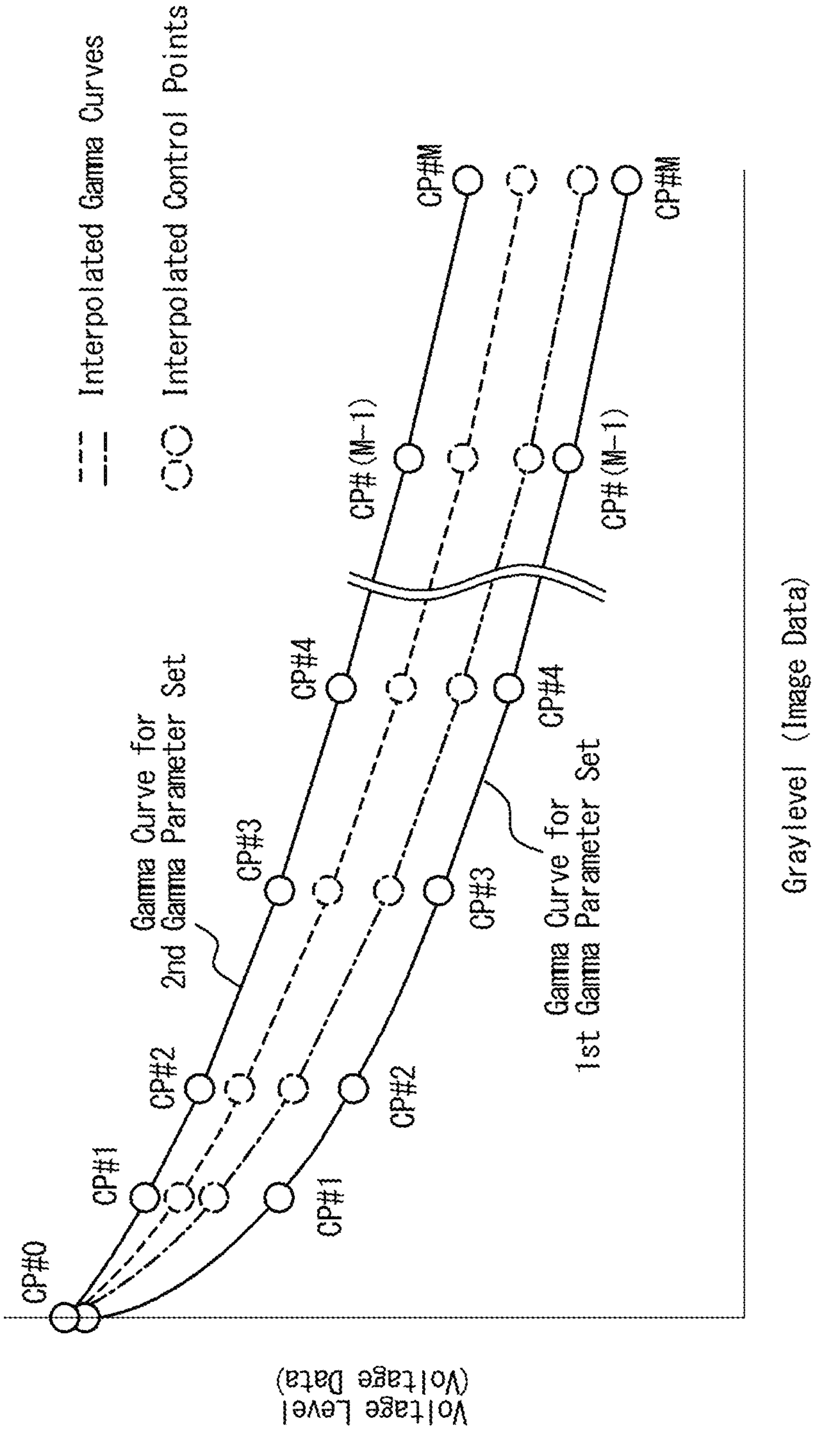
FIG. 4B illustrates example interpolated gamma parameter sets determined through interpolation of the first gamma parameter set and the second gamma parameter set, according to one or more embodiments.

FIG. 4B illustrates example interpolated gamma parameter sets determined through interpolation of the first gamma parameter set and the second gamma parameter set when the target pixel is located in the connection area 106, according to one or more embodiments. In the illustrated embodiment, each of the first gamma parameter set, the second gamma parameter set, and the interpolated gamma parameter sets includes coordinates of the control points #0 to #M that define a gamma curve. The coordinates of control point #i of an interpolated gamma parameter set is determined through interpolation of the coordinates of control point #i of the first gamma parameter set and the coordinates of control point #i of the second gamma parameter set. In one implementation, the interpolation is performed such that the control point #i of the interpolated gamma parameter set is closer to the control point #i of the first gamma parameter set as the target pixel is positioned closer to the first screen area 102 while the control point #i of the interpolated gamma parameter set is closer to the control point #i of the second gamma parameter set as the target pixel is positioned closer to the second screen area 104. In FIG. 4B, the gamma curves defined by the interpolated gamma parameter sets is referred to as interpolated gamma curves.

Referring back to FIG. 2, the gamma interpolation circuitry 222 may be configured to determine the area in which the target pixel is positioned from among the first screen area 102, the second screen area 104, or the connection area 106 based on a connection area configuration that defines the configuration of the connection area 106. In one implementation, the connection area configuration may indicate the position of the boundary between the first screen area 102 and the connection area 106 and the position of the boundary between the connection area 106 and the second screen area 104. The connection area configuration may be received from the controller 300. The connection area configuration may be transmitted from the controller 300 to the display driver 200 as part of the control data. In one implementation, the definitions of the first screen area 102, the second screen area 104, the connection area 106 can be adjusted by modifying the connection area configuration. For example, the width of the connection area 106 may be adjusted by modifying the connection area configuration.

The digital gamma circuitry 224 is configured to apply a gamma transformation to the image data to generate voltage data in accordance with the gamma curve defined by the resulting gamma parameter set, which may be the first gamma parameter set, the second gamma parameter set, or the interpolated gamma parameter set. In some embodiments, the image processing circuitry 220 may include an image processing core (not illustrated) configured to process the image data received from the interface circuitry 210 and provide the processed image data to the digital gamma circuitry 224. The voltage data is provided to the drive circuitry 230, which is configured to update the pixels of the display panel 100 with voltage levels specified by the voltage data.

Overall, the architecture illustrated in the embodiment of FIG. 2 is configured to determine a voltage level for a target pixel based on the gray level for the target pixel as follows.

(A) When the second screen area brightness control instruction 2nd_Scr_Ctrl is deactivated, the resulting gamma parameter set is determined to be the same as the first gramma parameter set regardless of the position of the target pixel, and the voltage level of the drive voltage for the target pixel is determined by applying a gamma transformation to the gray level of the target pixel in accordance with the gamma curve defined by the first gramma parameter set. As a result, the entire display panel 100 is controlled to the brightness level corresponding to the first gramma parameter set.

Figure 5A:
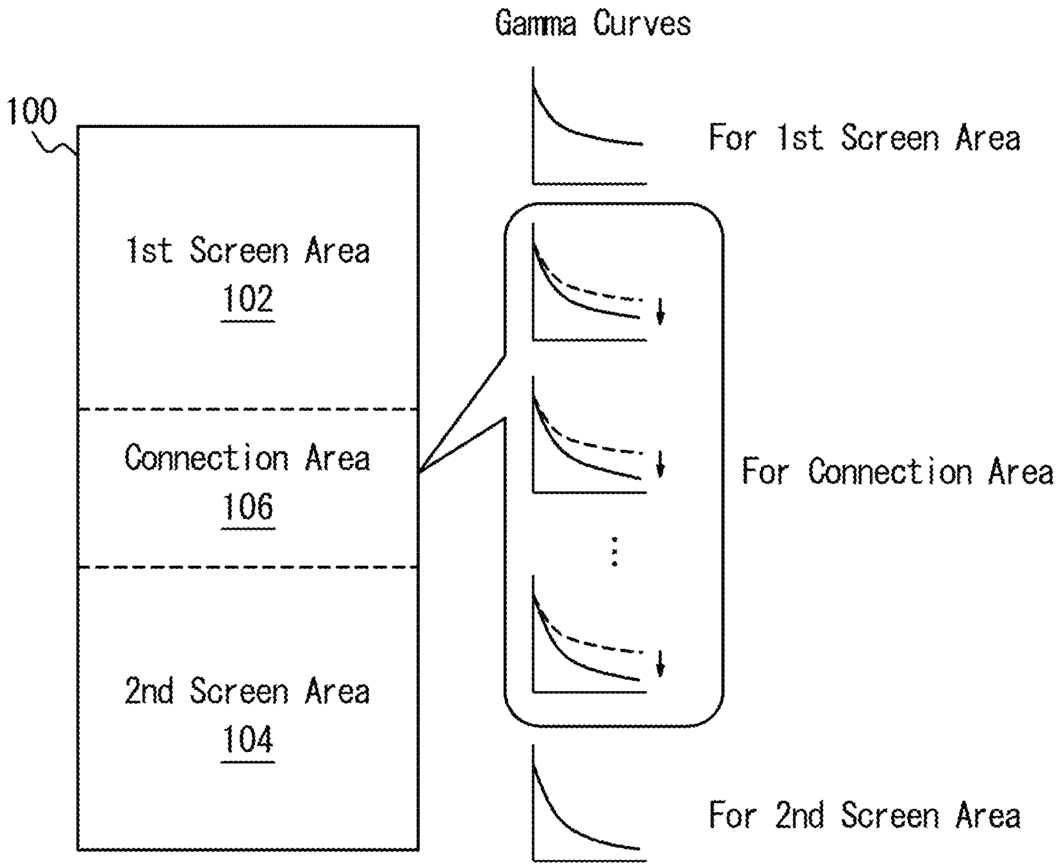
FIG. 5A illustrates example definitions of gamma curves for a first screen area, a second screen area, and a connection area, according to one or more embodiments.

(B) When the second screen area brightness control instruction 2nd_Scr_Ctrl is activated, the resulting gamma parameter set is selected from the first gamma parameter set, the second gamma parameter set and an interpolated gamma parameter set generated through interpolation of the first gamma parameter set and the second gamma parameter set, depending on the position of the target pixel. Referring to FIG. 5A, when the target pixel is positioned in the first screen area 102, the resulting gamma parameter set is determined to be the same as the first gramma parameter set, and the voltage level of the drive voltage for the target pixel is determined by applying a gamma transformation to the gray level of the target pixel in accordance with the gamma curve defined by the first gramma parameter set. When the target pixel is positioned in the second screen area 104, the resulting gamma parameter set is determined to be the same as the second gramma parameter set, and the voltage level of the drive voltage for the target pixel is determined by applying a gamma transformation to the gray level of the target pixel in accordance with the gamma curve defined by the second gramma parameter set. When the target pixel is positioned in the connection area 106, the resulting gamma parameter set is determined as an interpolated gramma parameter set generated through interpolation of the first gamma parameter set and the second gamma parameter set, and the voltage level of the drive voltage for the target pixel is determined by applying a gamma transformation to the gray level of the target pixel in accordance with the gamma curve defined by the interpolated gramma parameter set. The shape of the gamma curve for a target pixel in the connection area 106 is closer to the shape of the gamma curve for the first screen area 102 (which is defined by the first gamma parameter set) as the target pixel is closer to the first screen area and closer to the shape of the gamma curve for the second screen area 104 (which is defined by the second gamma parameter set) as the target pixel is closer to the second screen area 104.

Figure 5B:
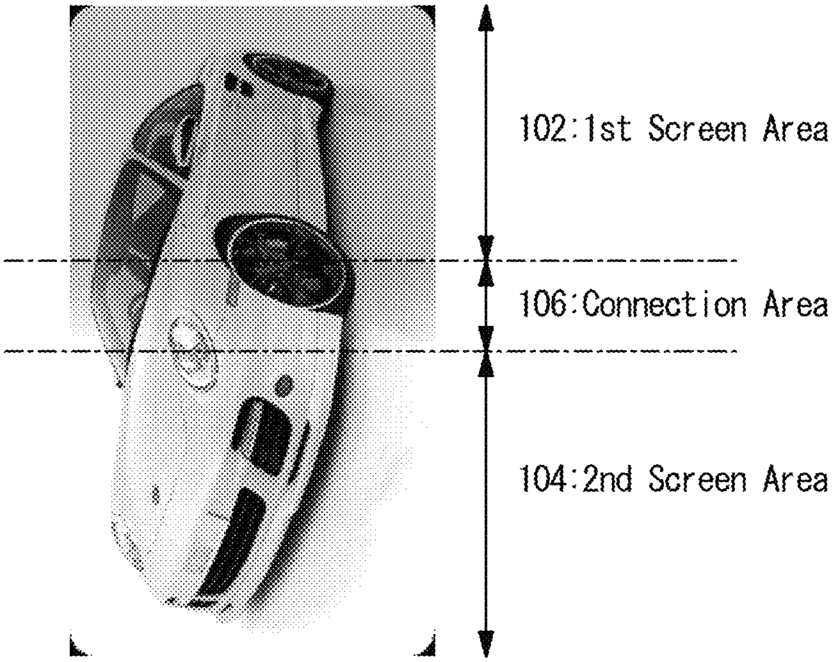
FIG. 5B illustrates an example image displayed on a display panel, according to one or more embodiments.

FIG. 5B illustrates an example image displayed on the display panel 100, according to one or more embodiments. In the illustrated embodiment, the brightness level of the first screen area 102 is lower than the brightness level of the second screen area 104. The portion of image displayed in the first screen area 102 is smoothly coupled to the portion of image displayed in the second screen area 104 by the portion of image displayed in the connection area 106 in which the brightness level gradually changes depending on the positions of the pixels in the display panel 100 through interpolation of the first gamma parameter set and the second gamma parameter set.

Figure 6:
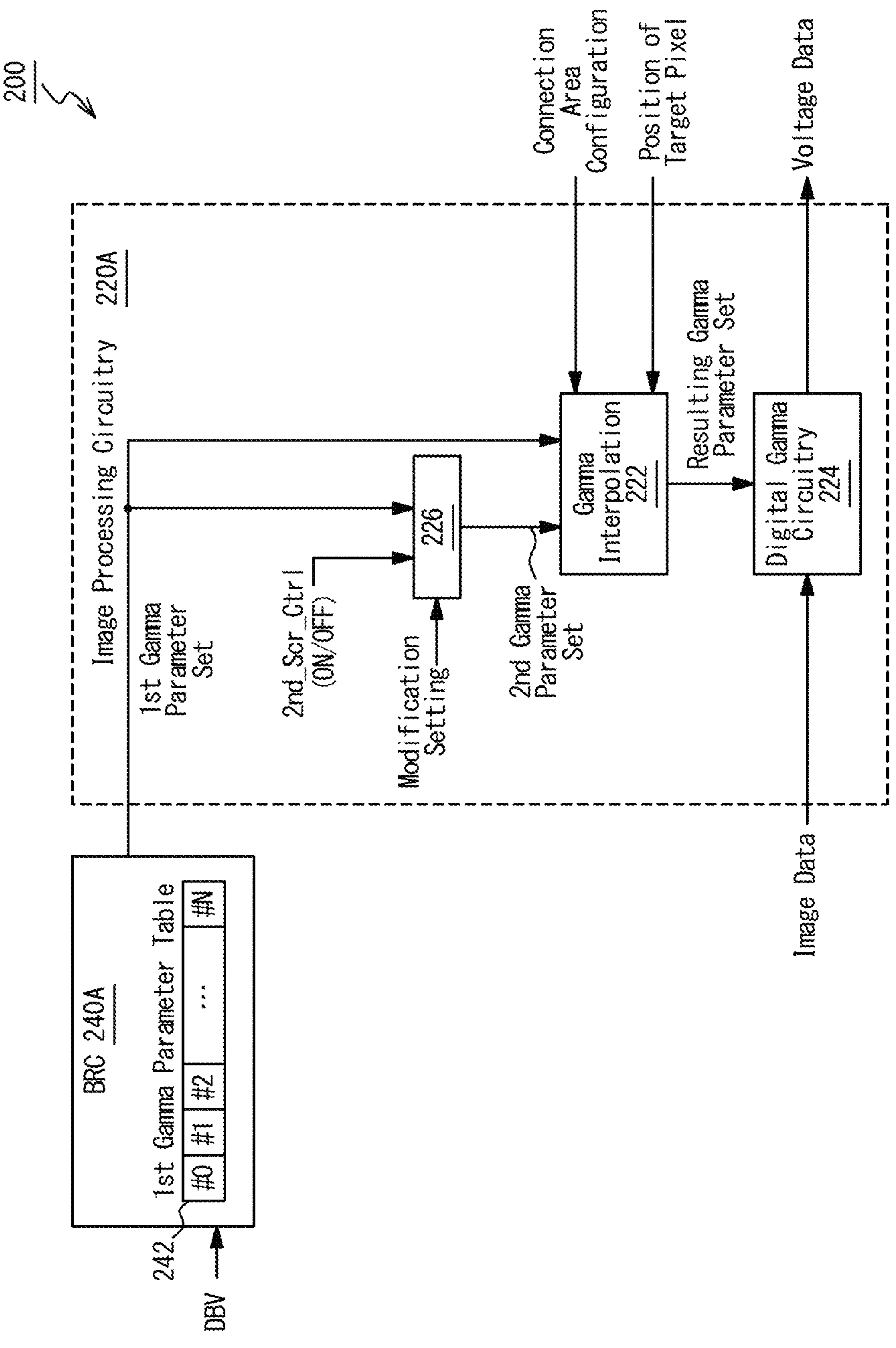
FIG. 6 illustrates an example partial configuration of a display driver, according to one or more embodiments.

FIG. 6 illustrates another example partial configuration of the display driver 200, according to one or more embodiments. In the illustrated embodiment, the BRC, denoted by numeral 240A, is configured to provide the first gamma parameter set to image processing circuitry 220A, and the image processing circuitry 220A is configured to generate the second gamma parameter set by modifying the first gamma parameter set.

In the illustrated embodiment, the BRC 240A includes the first gamma parameter table 242 that contains gamma parameter sets "#0" to "#N" and is configured to select the first gamma parameter set from among the gamma parameter sets "#0" to "#N" based on the DBV. In one implementation, the BRC 240A may be configured to select the gamma parameter set #i of the first gamma parameter table 242 as the first gamma parameter set when the DBV is in the DBV range #i.

The image processing circuitry 220A includes modification circuitry 226 configured to modify the first gamma parameter set to generate the second gamma parameter set. The modification of the first gamma parameter set may be performed as indicated by a modification setting provided to the modification circuitry 226. The modification setting may be received from the controller 300. The modification setting may be transmitted from the controller 300 to the display driver 200 as part of the control data. In embodiments where the first gamma parameter set includes coordinates of control points #0 to #M as illustrated in FIG. 3, the modification setting may indicate how the coordinates of control points #0 to #M of the first gamma parameter set is to be modified to determine the coordinates of control points #0 to #M of the second gamma parameter set. In one implementation, the coordinates of control points #0 to #M of the second gamma parameter set may be determined by multiplying the coordinates along the first coordinate axis (the horizontal axis in FIG. 3) of control points #0 to #M of the first gamma parameter set by a first coefficient and/or multiplying the coordinates along the second coordinate axis (the vertical axis in FIG. 3) of control points #0 to #M of the first gamma parameter set by a second coefficient. In such embodiments, the modification setting may include the first coefficient and/or the second coefficient.

The modification circuitry 226 may be responsive to the second screen area brightness control instruction 2nd_Scr_Ctrl for modifying the first gamma parameter set.

In one implementation, the modification circuitry 226 may be configured to determine the second gamma parameter set to be the same as the first gamma parameter set without modification in response to the second screen area brightness control instruction 2nd_Scr_Ctrl being deactivated. The modification circuitry 226 may be configured to generate the second gamma parameter set by modifying the first gamma parameter set in accordance with the modification setting in response to the second screen area brightness control instruction 2nd_Scr_Ctrl being activated.

The gamma interpolation circuitry 222 is configured to determine a resulting gamma parameter set based on the first gamma parameter set, the second gamma parameter set, and the position of the target pixel as described in relation to FIG. 2. The digital gamma circuitry 224 is configured to apply a gamma transformation to the image data to generate voltage data in accordance with the gamma curve defined by the resulting gamma parameter set as described in relation to FIG. 2.

The configuration illustrated in FIG. 6, in which the BRC 240A only includes one gamma parameter table (the first gamma parameter table 242 in the illustrated embodiment), may effectively reduce hardware of the BRC 240A. The reduction of the hardware may be advantageous for cost reduction.

Figure 7:
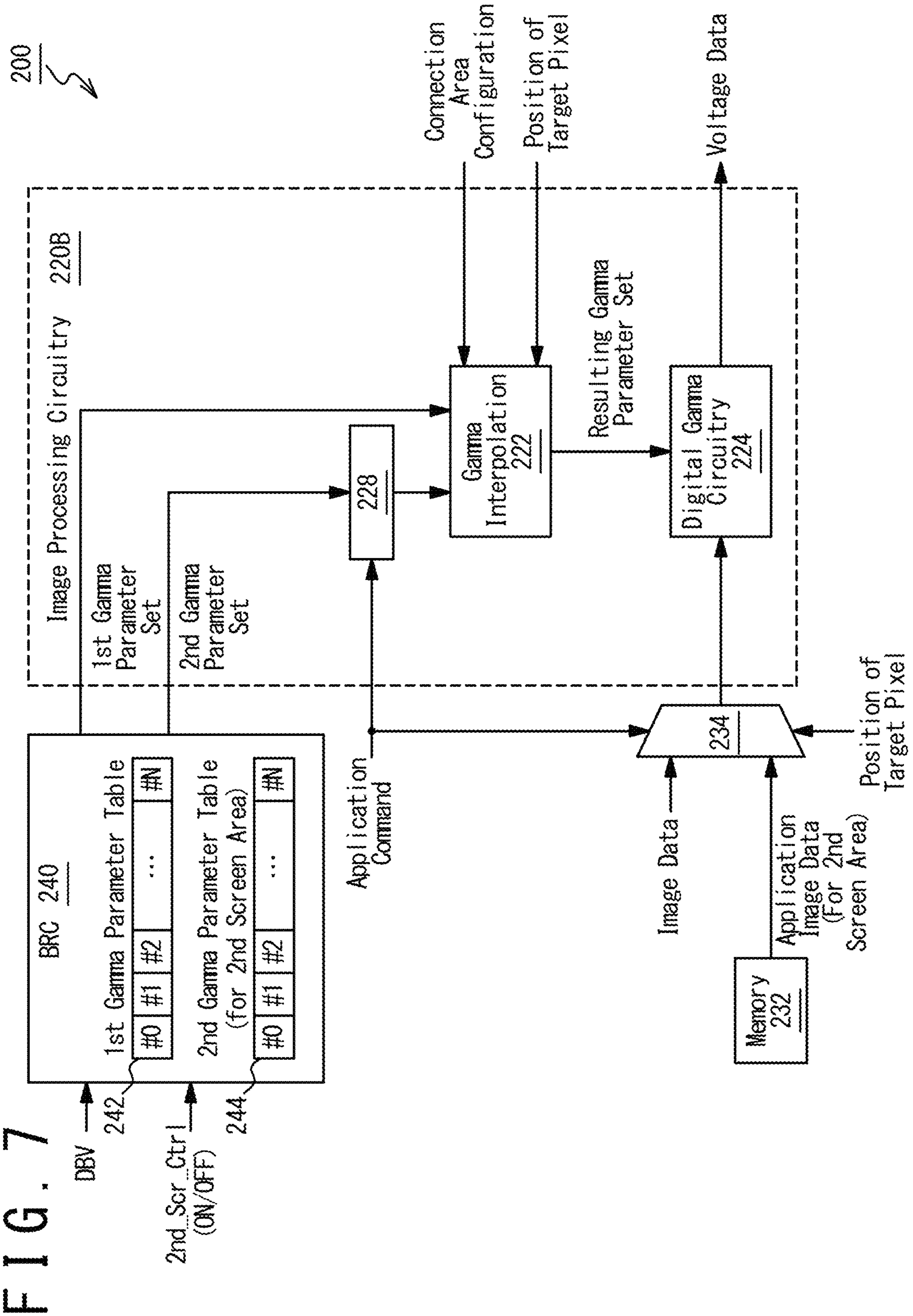
FIG. 7 illustrates an example partial configuration of a display driver, according to one or more embodiments.

FIG. 7 illustrates another example partial configuration of the display driver 200, according to one or more embodiments. In the illustrated embodiment, an application command is issued by the application software 310 installed on the controller 300 (illustrated in FIG. 1), and the application command is provided to the display driver 200. The display driver 200 is configured to operate as instructed by the application command. The application command may be provided to the display driver 200 as part of the control data.

In the embodiment illustrated in FIG. 7, the display driver 200 further includes a memory 232 and a selector 234. The memory 232 is configured to store an application image data. The application image data may correspond to an application-related image to be displayed in the second screen area 104 in response to the application command. The application-related image may include a user interface image such as a software keyboard, a menu, and other navigation elements. The selector 234 is configured to select the image data received from the interface circuitry 210 or the application image data received from the memory 232 in response to the application command and the position of the target pixel and provide the selected image data to the image processing circuitry 220B.

In the embodiment illustrated in FIG. 7, the image processing circuitry, denoted by numeral 220B, is configured to receive the first gamma parameter set and the second gamma parameter set from the BRC 240. In one implementation, the BRC 240 may be configured to determine the first gamma parameter set and the second gamma parameter set as described in relation to FIG. 2.

The image processing circuitry 220B additionally includes modification circuitry 228 configured to modify the second gamma parameter set in response to the application command. The application command may include an instruction that instructs the modification circuitry 228 to modify the second gamma parameter set to achieve a desired brightness level in the second screen area 104. In embodiments where the second gamma parameter set includes coordinates of control points #0 to #M as illustrated in FIG. 3, the application command may indicate how the coordinates of control points #0 to #M of the second gamma parameter set is to be modified. In one implementation, the application command may include a first coefficient, and the coordinates along the first coordinate axis (the horizontal axis in FIG. 3) of control points #0 to #M of the second gamma parameter set may be multiplied by the first coefficient. The application command may additionally or alternatively include a second coefficient, and the coordinates along the second coordinate axis (the vertical axis in FIG. 3) of control points #0 to #M of the second gamma parameter set may be multiplied by the second coefficient.

The rest of the image processing circuitry 220B may be configured to operate similarly to the image processing circuitry 220 illustrated in FIG. 2. The gamma interpolation circuitry 222 is configured to determine the resulting gamma parameter set based on the first gamma parameter set, the second gamma parameter set (which may be modified by the modification circuitry 228), and the position of the target pixel as described in relation to FIG. 2. The digital gamma circuitry 224 is configured to apply a gamma transformation to the image data to generate voltage data in accordance with the gamma curve defined by the resulting gamma parameter set, which may be the first gamma parameter set, the second gamma parameter set, or the interpolated gamma parameter set.

The architecture illustrated in FIG. 7 is configured to offer the brightness control described above in relation to FIGS. 2 to 5B. When the second screen area brightness control instruction 2nd_Scr_Ctrl is deactivated, the entire display panel 100 is controlled to the same brightness level in accordance with the gamma curve defined by the first gramma parameter set. When the second screen area brightness control instruction 2nd_Scr_Ctrl is activated, the first screen area 102 and the second screen area 104 are individually controlled to different brightness levels while the image part displayed in the first screen area 102 is smoothly coupled to the image part displayed in the second screen area 104 by the image part displayed in the connection area 106 in which the brightness level gradually changes.

The architecture illustrated in FIG. 7 is further configured to display the application-related image, which may include a user interface image such as a software keyboard, a menu, and other navigation elements, in the second screen area 104, while the brightness level of the second screen area 104 is controlled as instructed by the application command. When desiring to display the application-related image in the second screen area 104, the application software 310 issues and sends the application command to the display driver 200. The selector 234 selects the image data received from the interface circuitry 210 or the application image data received from the memory 232 in response to the application command and the position of the target pixel. For pixels that are not positioned in the second screen area 104, the selector 234 selects the image data received from the interface circuitry 210. For pixels positioned in the second screen area 104, the selector 234 selects the application image data stored in the memory 232 in response to the application command instructing to display the application-related image. As a result, the image corresponding to the image data received from the interface circuitry 210 is displayed in the first screen area 102 and the connection area 106 while the application-related image is displayed in the second screen area 104. Meanwhile, the modification circuitry 228 modifies the second gamma parameter set as instructed by the application command. By modifying the second gamma parameter set, the application-related image is displayed in the second screen area 104 with the brightness level instructed by the application command.

Figure 8:
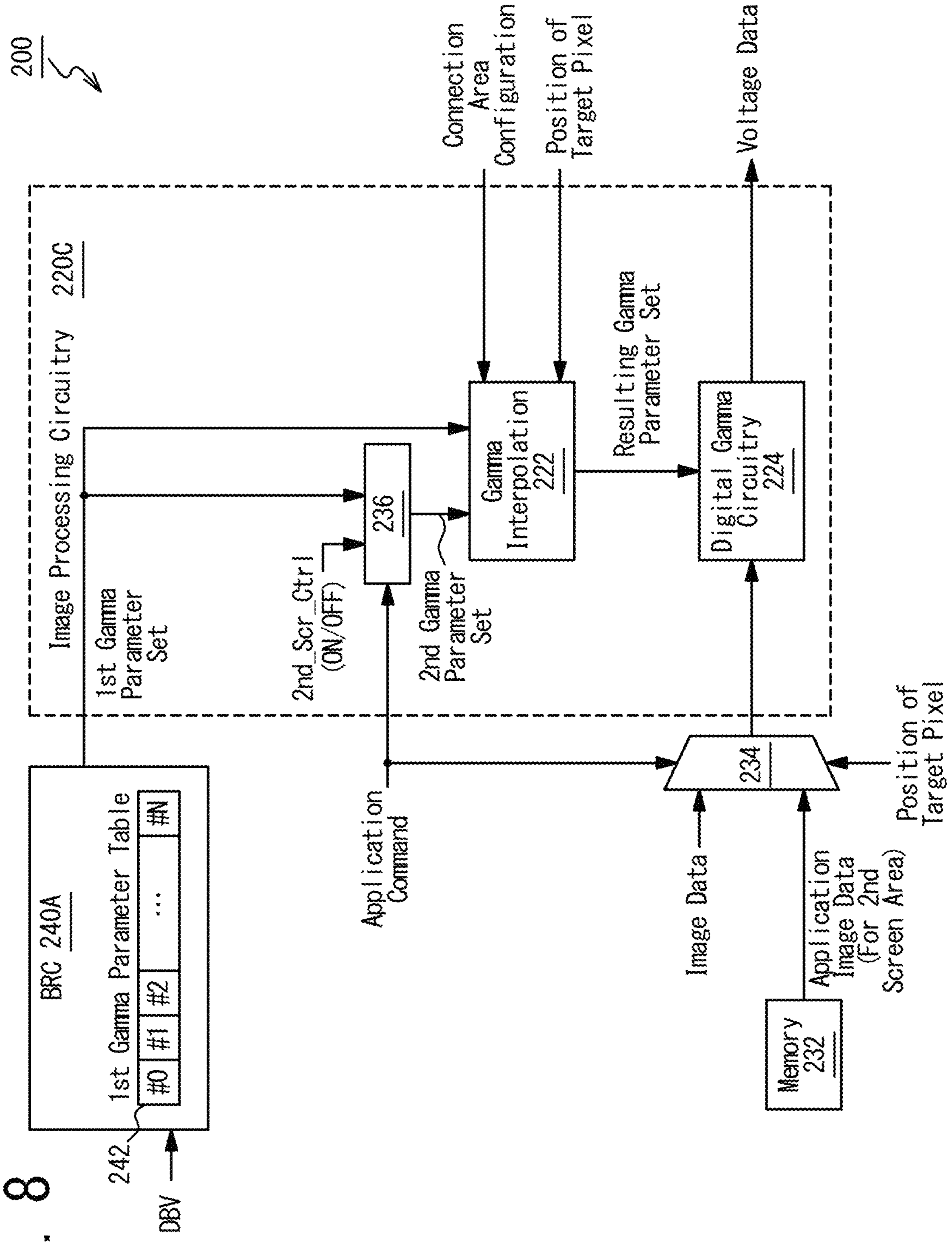
FIG. 8 illustrates an example partial configuration of a display driver, according to one or more embodiments.

FIG. 8 illustrates another example partial configuration of the display driver 200, according to one or more embodiments. In the embodiment illustrated in FIG. 8, similarly to the embodiment illustrated in FIG. 7, the display driver 200 includes the memory 232 and the selector 234 and is configured to operate in response to an application command issued by the application software 310 installed on the controller 300. One difference is that the BRC 240A is configured to provide the first gamma parameter set to image processing circuitry 220C, and the image processing circuitry 220C is configured to generate the second gamma parameter set by modifying the first gamma parameter set. In the illustrated embodiment, the BRC 240A includes the first gamma parameter table 242 that contains gamma parameter sets "#0" to "#N" and is configured to select the first gamma parameter set from among the gamma parameter sets "#0" to "#N" based on the DBV. In one implementation, the BRC 240A may be configured to select the gamma parameter set #i of the first gamma parameter table 242 as the first gamma parameter set when the DBV is in the DBV range #i.

The image processing circuitry 220C includes modification circuitry 236 configured to modify the first gamma parameter set to generate the second gamma parameter set. The modification circuitry 236 may be responsive to the second screen area brightness control instruction 2nd_Scr_Ctrl for modifying the first gamma parameter set. In one implementation, the modification circuitry 236 may be configured to determine the second gamma parameter set to be the same as the first gamma parameter set in response to the second screen area brightness control instruction 2nd_Scr_Ctrl being deactivated. The modification circuitry 236 may be further configured to generate the second gamma parameter set by modifying the first gamma parameter set in accordance with a predetermined modification setting in response to the second screen area brightness control instruction 2nd_Scr_Ctrl being activated. In embodiments where the first gamma parameter set includes coordinates of control points #0 to #M as illustrated in FIG. 3, the predetermined modification setting may indicate how the coordinates of control points #0 to #M of the first gamma parameter set is to be modified to determine the coordinates of control points #0 to #M of the second gamma parameter set, as described in relation to the modification circuitry 226 illustrated in FIG. 6.

The modification circuitry 236 may be further configured to modify the second gamma parameter set in response to the application command. The application command may include an instruction that instructs the modification circuitry 236 to modify the second gamma parameter set to achieve a desired brightness level in the second screen area 104. In embodiments where the second gamma parameter set includes coordinates of control points #0 to #M as illustrated in FIG. 3, the application command may indicate how the coordinates of control points #0 to #N of the second gamma parameter set is to be modified described in relation to FIG. 7.

The gamma interpolation circuitry 222 is configured to determine a resulting gamma parameter set based on the first gamma parameter set, the second gamma parameter set, and the position of the target pixel as described in relation to FIG. 2. The digital gamma circuitry 224 is configured to apply a gamma transformation to the image data to generate voltage data in accordance with the gamma curve defined by the resulting gamma parameter set.

The architecture illustrated in FIG. 8 is configured to offer a similar brightness control described in relation to FIG. 7. When the second screen area brightness control instruction 2nd_Scr_Ctrl is deactivated, the entire display panel 100 is controlled to the same brightness level in accordance with the gamma curve defined by the first gramma parameter set. When the second screen area brightness control instruction 2nd_Scr_Ctrl is activated, the first screen area 102 and the second screen area 104 are individually controlled to different brightness levels while the image part displayed in the first screen area 102 is smoothly coupled to the image part displayed in the second screen area 104 by the image part displayed in the connection area 106 in which the brightness level gradually changes. The architecture illustrated in FIG. 8 is further configured to display the application-related image, which may include a user interface image such as a software keyboard, a menu, and other navigation elements, in the second screen area 104, while the brightness level of the second screen area 104 is controlled as instructed by the application command.

Figure 9A:
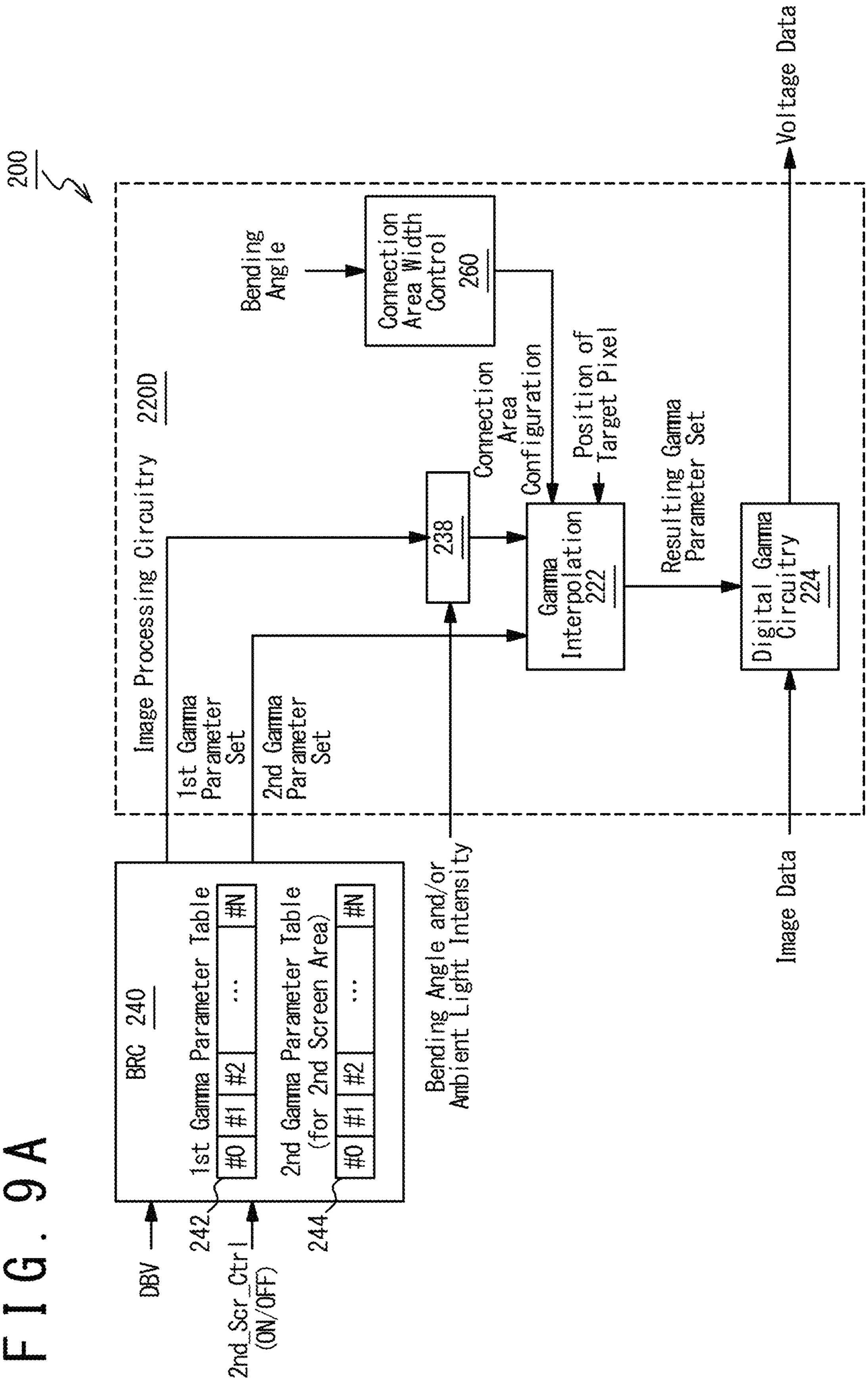
FIG. 9A illustrates an example partial configuration of a display driver, according to one or more embodiments.

FIG. 9A illustrates another example partial configuration of the display driver 200, according to one or more embodiments. The configuration illustrated in FIG. 9A is adapted to embodiments where the display panel 100 is foldable as described in relation to FIG. 1B. In one implementation, the display panel 100 can be bent at the connection area 106 and the bending angle, which is the angle between the first screen area 102 and the second screen area 104, is adjustable. The bending angle may be detected by a sensor coupled to the controller 300, and the controller 300 may be configured to inform the bending angle to the display driver 200. In one implementation, the bending angle may be provided from the controller 300 to the display driver 200 as part of the control data.

In one or more embodiments, the display driver 200 is configured to adjust the width of the connection area 106 in response to the bending angle. In the illustrated embodiment, the image processing circuitry, denoted by numeral 220D, includes connection area width control circuitry 260 configured to generate the connection area configuration based on the bending angle. The connection area configuration may indicate the position of the boundary between the first screen area 102 and the connection area 106 and the position of the boundary between the connection area 106 and the second screen area 104. The connection area width control circuitry 260 is configured to adjust the width of the connection area 106 by adjusting the position of the boundary between the first screen area 102 and the connection area 106 and/or the position of the boundary between the connection area 106 and the second screen area 104.

Figure 9B:
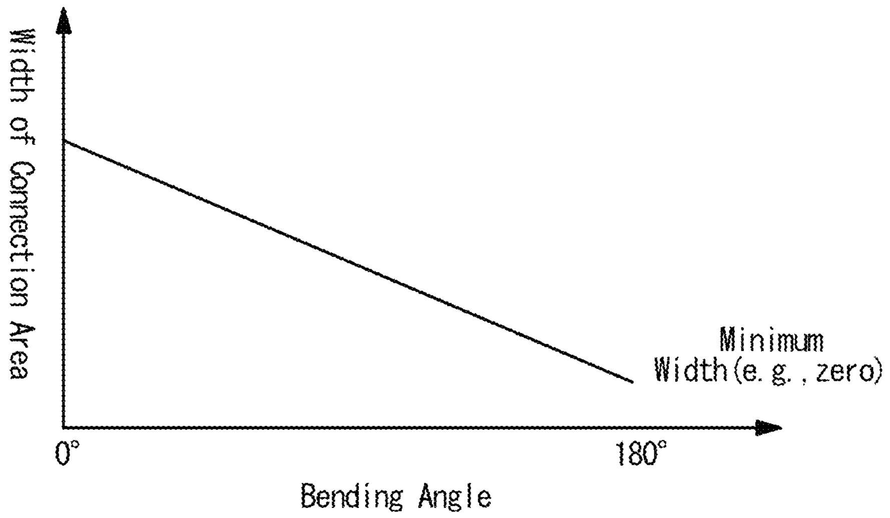
FIG. 9B illustrates an example adjustment of the width of a connection area based on a bending angle, according to one or more embodiments.

FIG. 9B illustrates an example adjustment of the width of the connection area 106 based on the bending angle, according to one or more embodiments. In the illustrated embodiment, the bending angle ranges from 0° to 180°. The connection area width control circuitry 260 may be configured to set the width of the connection area 106 to the minimum width (e.g., zero) when the display panel 100 is flat (that is, the bending angle is 180°). The connection area width control circuitry 260 may be further configured to increase the width of the connection area 106 as the bending angle decreases from 180° toward 0°. While FIG. 9B illustrates the width of the connection area 106 changes linearly to the bending angle, the width of the connection area 106 may change non-linearly.

Figure 9C:
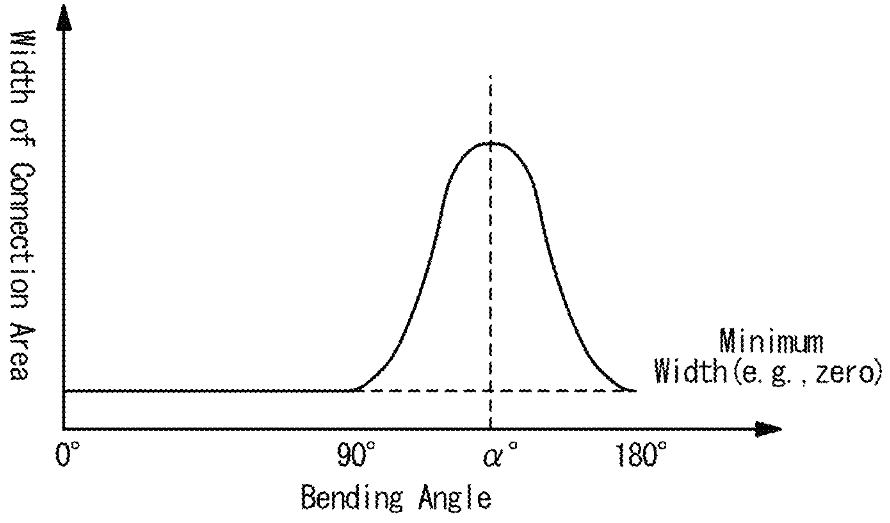
FIG. 9C illustrates another example adjustment of the width of a connection area based on a bending angle, according to one or more embodiments.

FIG. 9C illustrates another example adjustment of the width of the connection area 106 based on the bending angle, according to one or more embodiments. The connection area width control circuitry 260 may be configured to set the width of the connection area 106 to the minimum width (e.g., zero) when the bending angle is 90° or less. The connection area width control circuitry 260 may be further configured to set the width of the connection area 106 such that the width of the connection area 106 increases as the bending angle increases when the bending angle is between 90° and α°, where α° is the bending angle at which the width of the connection area 106 is maximum. The connection area width control circuitry 260 may be further configured to set the width of the connection area 106 such that the width of the connection area 106 decreases as the bending angle increases when the bending angle is between α° and 180°. The connection area width control circuitry 260 may be further configured to set the width of the connection area 106 to the minimum width (e.g., zero) when the display panel 100 is flat (that is, the bending angle is 180°).

Figure 9D:
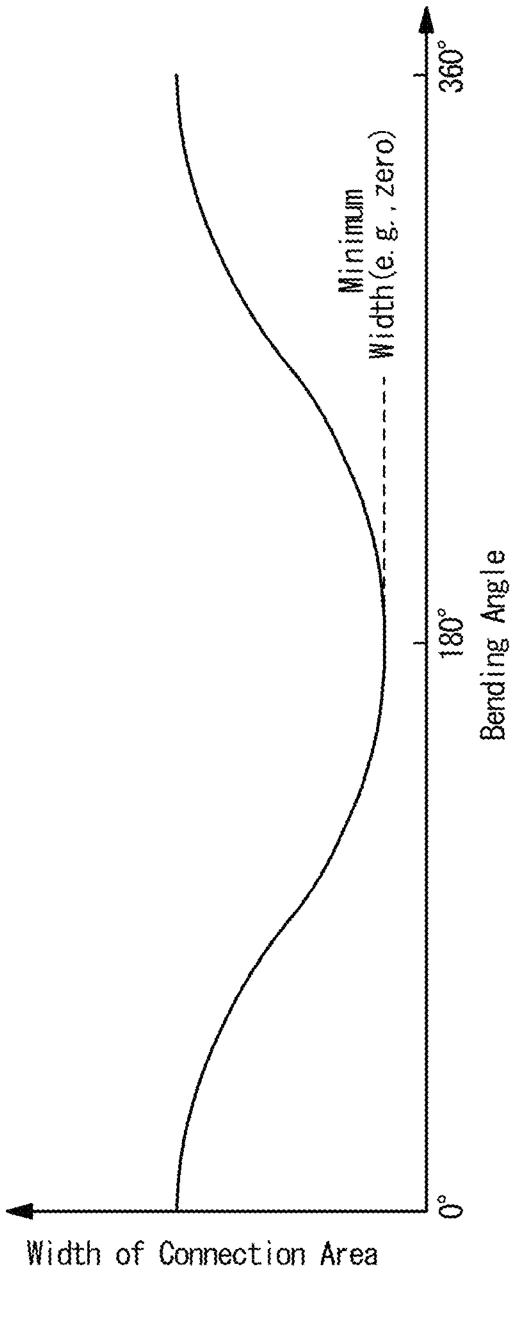
FIG. 9D illustrate still another example adjustment of the width of a connection area based on a bending angle, according to one or more embodiments.

FIG. 9D illustrates still other example adjustment of the width of the connection area 106 based on the bending angle, according to one or more embodiments. In the illustrated embodiment, the bending angle ranges from 0° to 360°. The connection area width control circuitry 260 may be configured to set the width of the connection area 106 to the minimum width (e.g., zero) when the display panel 100 is flat (that is, the bending angle is 180°). The connection area width control circuitry 260 may be further configured to increase the width of the connection area 106 as the bending angle decreases from 180° toward 0°. The connection area width control circuitry 260 may be further configured to increase the width of the connection area 106 as the bending angle increases from 180° toward 360°.

Referring back to FIG. 9A, the image processing circuitry 220D may further include modification circuitry 238 configured to modify the first gamma parameter set in response to the bending angle. In embodiments where main contents (e.g., still images, moving images, graphics, and other illustrations) are displayed on the first screen area 102, modifying the first gamma parameter set in response to the bending angle may effectively improve the image quality of the displayed main contents because the intensity of ambient light incident to the first screen area 102 may vary depending on the bending angle. In some embodiment, the modification circuitry 238 may be configured to modify the first gamma parameter set to increase the brightness level of the first screen area 102 as the bending angle is closer to 180° (the flat state of the display panel 100), since the ambient light intensity on the first screen area 102 may increase as the bending angle is closer to 180°. In other embodiments, the modification circuitry 238 is omitted and the first gamma parameter set is provided to the gamma interpolation circuitry 222 without modification.

The modification circuitry 238 may be configured to modify the first gamma parameter set in response to the ambient light intensity in addition to or instead of the bending angle. The ambient light intensity may correspond to the intensity of the ambient light incident to the display panel 100. The ambient light intensity may be detected by a sensor coupled to the controller 300, and the controller 300 may be configured to inform the ambient light intensity to the display driver 200. In one implementation, the ambient light intensity may be provided from the controller 300 to the display driver 200 as part of the control data. In some embodiments, the modification circuitry 238 may be configured to modify the first gamma parameter set to increase the brightness level of the first screen area 102 as the ambient light intensity increases. Increasing the brightness level of the first screen area 102 as the ambient light intensity increases may effectively improves the image quality of the image displayed on the first screen area 102.

The rest of the image processing circuitry 220D may be configured to operate similarly to the image processing circuitry 220 illustrated in FIG. 2. The gamma interpolation circuitry 222 is configured to determine the resulting gamma parameter set based on the first gamma parameter set, the second gamma parameter set (which may be modified by the modification circuitry 238), and the position of the target pixel as described in relation to FIG. 2. The digital gamma circuitry 224 is configured to apply a gamma transformation to the image data to generate voltage data in accordance with the gamma curve defined by the resulting gamma parameter set, which may be the first gamma parameter set, the second gamma parameter set, or the interpolated gamma parameter set.

Figure 10:
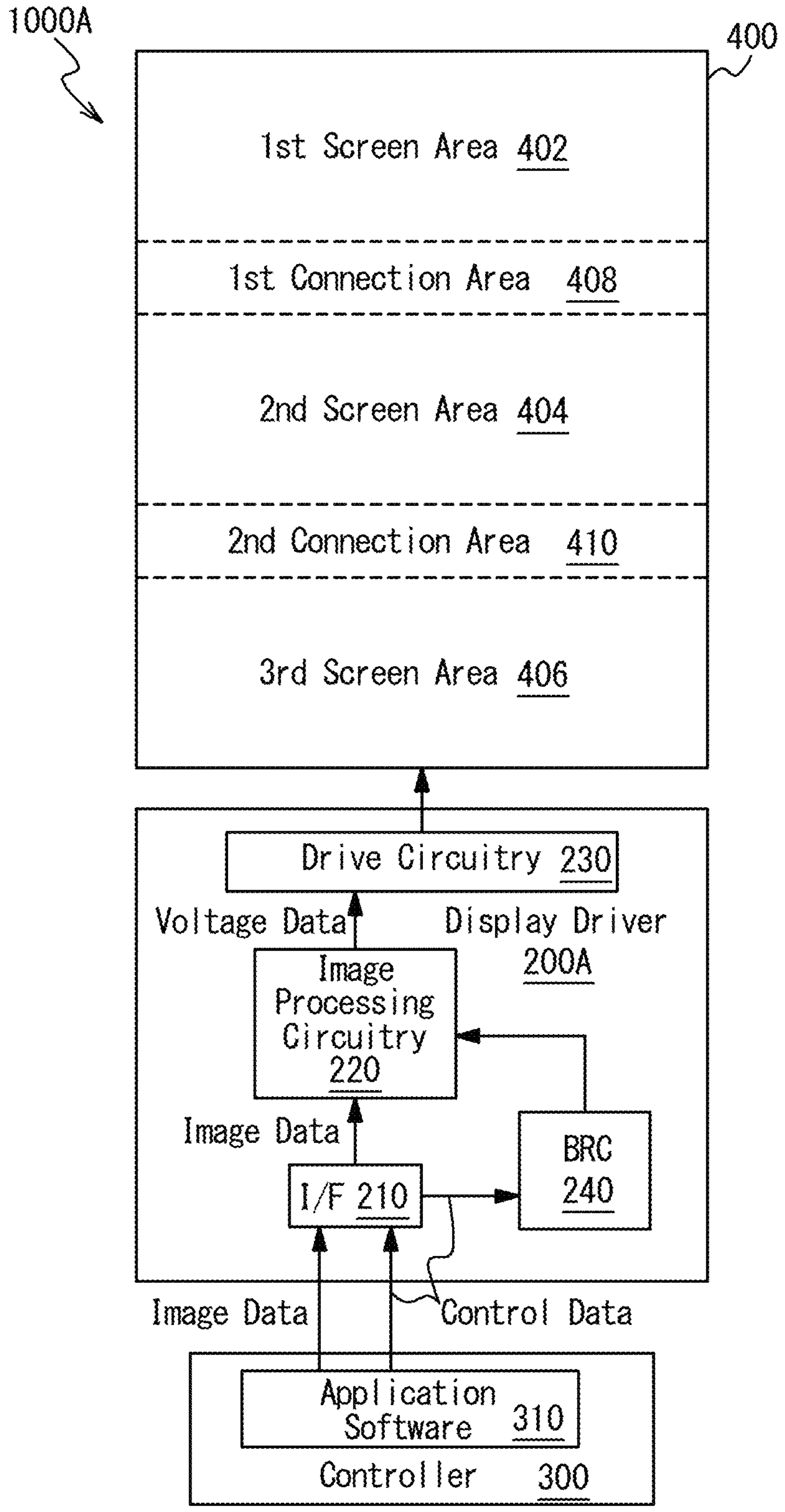
FIG. 10 illustrates an example configuration of a display system, according to one or more embodiments.

While the above-given description related to the attached drawings is based on display systems in which two screen areas and one connection area therebetween are defined in the display panel 100, those skilled in the art would appreciate that the technical concept of this disclosure also applies to display systems with three or more screen areas. FIG. 10 illustrates an example configuration of a display system 1000A in which three screen areas are defined in a display panel 400, according to one or more embodiments. In the illustrated embodiment, a display driver 200A is configured to define a first screen area 402, a second screen area 404, a third screen area 406 for the display panel 400 and individually control the brightness levels of these screen areas. The display driver 200A may be further configured to define a first connection area 408 and a second connection area 410. The first connection area 408 is disposed between the first screen area 402 and the second screen area 404 and the second connection area 410 is disposed between the second screen area 404 and the third screen area 406. The first screen area 402, the first connection area 408, the second screen area 404, the second connection area 410, and the third screen area 406 are arrayed in this order in the vertical direction of the display panel 400.

Figure 11:
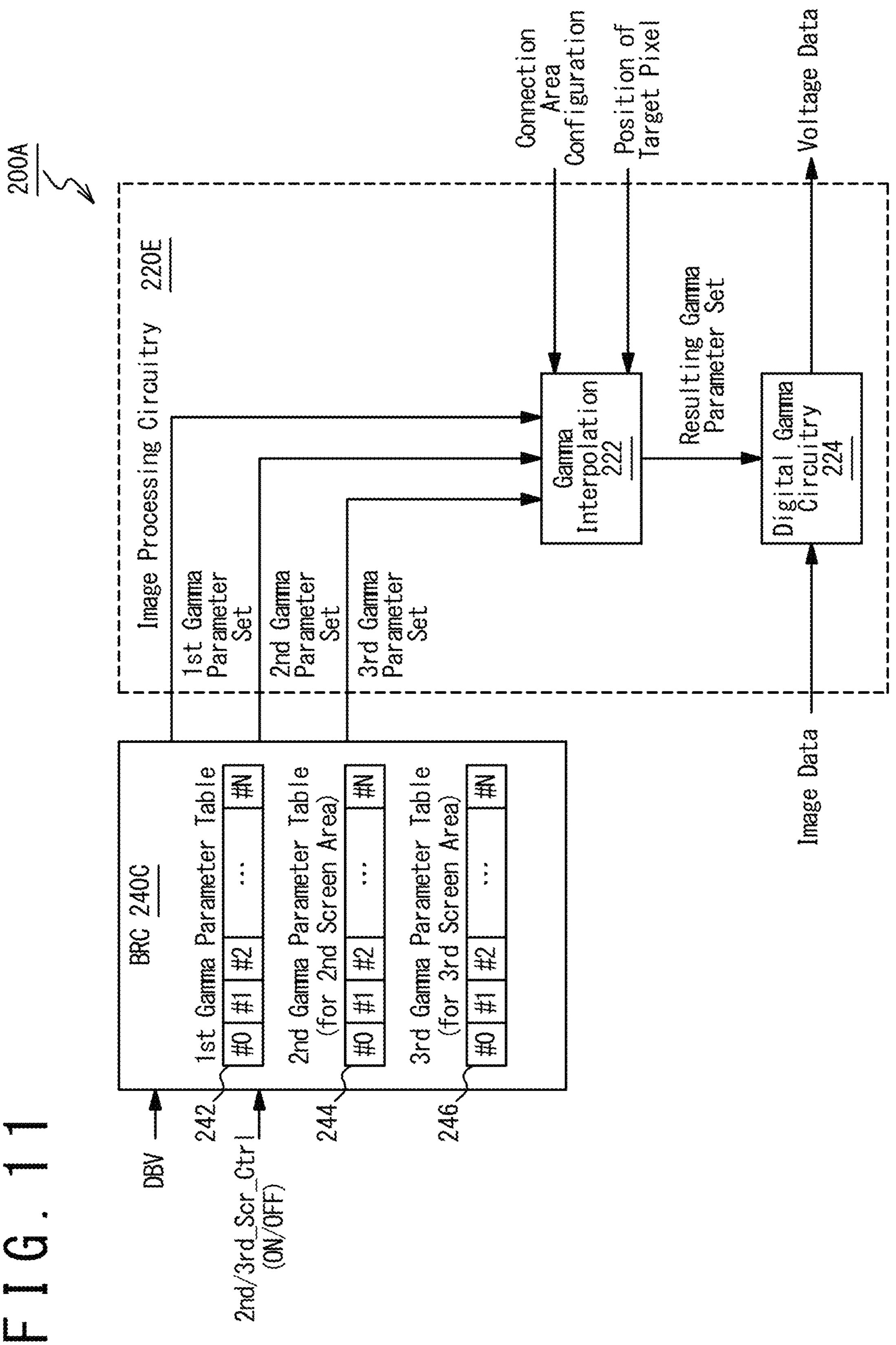
FIG. 11 illustrates an example partial configuration of a display driver, according to one or more embodiments.

FIG. 11 illustrates an example partial configuration of the display driver 200A, according to one or more embodiments. In the illustrated embodiment, a BRC 240C is configured to provide a first gamma parameter set, a second gamma parameter set, and a third gamma parameter set to image processing circuitry 220E. The first gamma parameter set defines a first gamma curve for the first screen area 402, the second gamma parameter set defines a second gamma curve for the second screen area 404, and the third gamma parameter set defines a third gamma curve for the third screen area 406.

In the illustrated embodiment, the BRC 240C is configured similarly to the BRC 240 illustrated in FIG. 2, while additionally including a third gamma parameter table 246 that contains a plurality of gamma parameter sets, denoted by "#0" to "#N" in FIG. 11, which define different gamma curves. The third gamma parameter table 246 relates the gamma parameter sets #0 to #N to DBVs.

The BRC 240C is configured to determine the first gamma parameter set based on the first gamma parameter table 242 and the DBV. In some embodiments, the BRC 240C is configured to select the first gamma parameter set from the gamma parameter sets #0 to #N of the first gamma parameter table 242 based on the DBV.

The BRC 240C is further configured to determine the second gamma parameter set and the third gamma parameter set based on the DBV and an individual brightness control instruction 2nd/3rd_Scr_Ctrl. The individual brightness control instruction 2nd/3rd_Scr_Ctrl may instruct the BRC 240C whether or not to individually control the brightness levels of the first screen area 402, the second screen area 404, and the third screen area 406. The individual brightness control instruction 2nd/3rd_Scr_Ctrl may be received from the controller 300 as part of the control data. In various embodiments, the BRC 240C may be configured to select the second gamma parameter set from the gamma parameter sets #0 to #N of the second gamma parameter table 244 based on the DBV in response to activation of the individual brightness control instruction 2nd/3rd_Scr_Ctrl. The BRC 240C may be further configured to select the third gamma parameter set from the gamma parameter sets #0 to #N of the third gamma parameter table 246 based on the DBV in response to activation of the individual brightness control instruction 2nd/3rd_Scr_Ctrl. By selecting the second gamma parameter set from the second gamma parameter table 244 and the third gamma parameter set from the third gamma parameter table 246, the brightness levels of the second screen area 404 and the third screen area 406 are controlled independently of the brightness level of the first screen area 402.

The BRC 240C may be further configured to determine the second gamma parameter set and the third gamma parameter set to be the same as the first gamma parameter set in response to deactivation of the individual brightness control instruction 2nd/3rd_Scr_Ctrl. By determining the second gamma parameter set and the third gamma parameter set to be the same as the first gamma parameter set, the brightness levels of the first, second, and third screen areas 402, 404, and 406 are controlled to be equal to each other, resulting in that the brightness level of the entire display panel 100 is controlled by the first gamma parameter set. The first gamma parameter set, the second gamma parameter set, and the third gamma parameter set are provided to the gamma interpolation circuitry 222 of the image processing circuitry 220E.

The gamma interpolation circuitry 222 is configured to determine a resulting gamma parameter set based on the first gamma parameter set, the second gamma parameter set, the third gamma parameter set, and the position of a target pixel for which the gamma transformation is to be performed. In one implementation, the gamma interpolation circuitry 222 is configured to select the first gamma parameter set as the resulting gamma parameter set when the target pixel is located in the first screen area 402, select the second gamma parameter set as the resulting gamma parameter set when the target pixel is located in the second screen area 404, and select the third gamma parameter set as the resulting gamma parameter set when the target pixel is located in the third screen area 406. The gamma interpolation circuitry 222 is further configured to determine the resulting gamma parameter set as a first interpolated gamma parameter set generated through interpolation of the first gamma parameter set and the second gamma parameter set based on the position of the target pixel when the target pixel is located in the first connection area 408. The gamma interpolation circuitry 222 is further configured to determine the resulting gamma parameter set as a second interpolated gamma parameter set generated through interpolation of the second gamma parameter set and the third gamma parameter set based on the position of the target pixel when the target pixel is located in the second connection area 410. The gamma interpolation circuitry 222 may be configured to determine the area in which the target pixel is positioned from among the first screen area 402, the second screen area 404, the third screen area 406, the first connection area 408, or the second connection area 410 based on the connection area configuration which may be received from the controller 300.

The digital gamma circuitry 224 is configured to apply a gamma transformation to the image data to generate voltage data in accordance with the gamma curve defined by the resulting gamma parameter set, which may be the first gamma parameter set, the second gamma parameter set, the third gamma parameter set, the first interpolated gamma parameter set or the second interpolated gamma parameter set. The voltage data is provided to the drive circuitry 230 (illustrated in FIG. 10) and used to update the pixels of the display panel 400.

Figure 12:
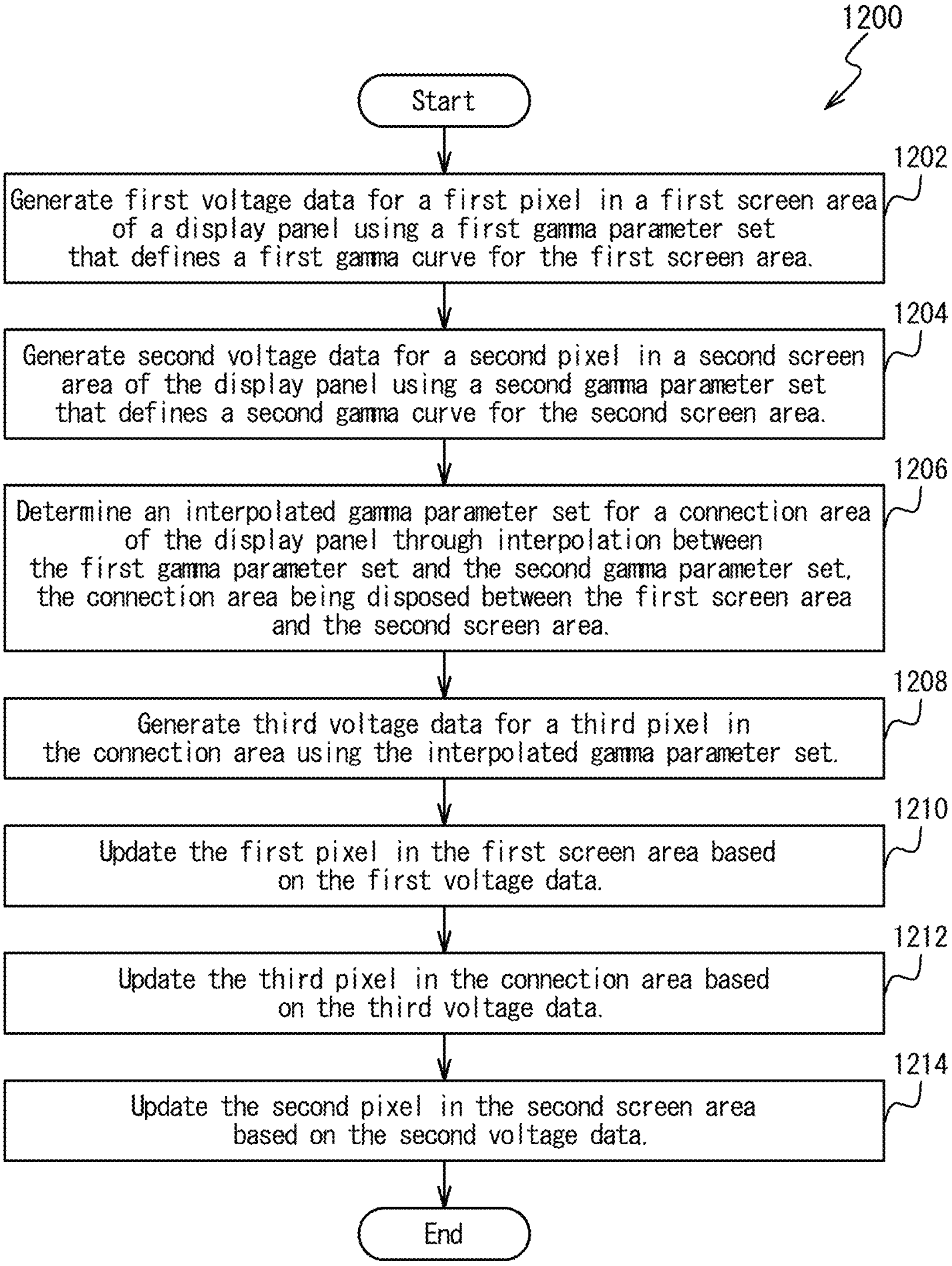
FIG. 12 is an illustrative flowchart depicting an example method of driving a display panel, according to one or more embodiments.

Method 1200 of FIG. 12 illustrates example steps for driving a display panel (e.g., the display panel 100 in FIG. 1 and the display panel 400 in FIG. 10), according to one or more embodiments. It is noted that one or more of the steps illustrated in FIG. 12 may be omitted, repeated, and/or performed in a different order than the order illustrated in FIG. 12. It is further noted that two or more steps may be implemented at the same time.

The method 1200 includes generating first voltage data for a first pixel in a first screen area (e.g., the first screen area 102 in FIG. 1 and the first screen area 402 in FIG. 10) of a display panel using a first gamma parameter set that defines a first gamma curve for the first screen area at step 1202. The method 1200 further includes generating second voltage data for a second pixel in a second screen area (e.g., the second screen area 104 in FIG. 1 and the second screen area 404 in FIG. 10) of the display panel using a second gamma parameter set that defines a second gamma curve for the second screen area at step 1204.

The method 1200 further includes determining an interpolated gamma parameter set for a connection area (e.g., the connection area 106 in FIG. 1 and the first and second connection areas 408 and 410 in FIG. 10) of the display panel through interpolation between the first gamma parameter set and the second gamma parameter set at step 1206. The connection area is disposed between the first screen area and the second screen area. The method 1200 further includes generating third voltage data for a third pixel in the connection area using the interpolated gamma parameter set at step 1208.

The method 1200 further includes updating the first pixel in the first screen area based on the first voltage data at step 1210. The method 1200 further includes updating the third pixel in the connection area based on the third voltage data at step 1212. The method 1200 further includes updating the second pixel in the second screen area based on the second voltage data at step 1214.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display driver, comprising:

image processing circuitry configured to:

modify a width of a connection area between a first screen area and a second screen area of a display panel, the connection area being disposed between the first screen area and the second screen area, generate first voltage data for a first pixel in the first screen area of the display panel using a first gamma parameter set that defines a first gamma curve for the first screen area, generate second voltage data for a second pixel in the second screen area of the display panel using a second gamma parameter set that defines a second gamma curve for the second screen area, determine an interpolated gamma parameter set for a third pixel in the connection area of the display panel through interpolation between the first gamma parameter set and the second gamma parameter set, and generate third voltage data for the third pixel using the interpolated gamma parameter set; and drive circuitry configured to:

update the first pixel in the first screen area based on the first voltage data, update the second pixel in the second screen area based on the second voltage data, and update the third pixel in the connection area based on the third voltage data.

2. The display driver of claim 1, wherein the interpolation is based on a position of the third pixel in the display panel.

3. The display driver of claim 1, wherein the image processing circuitry is further configured to generate the second gamma parameter set by modifying the first gamma parameter set.

4. The display driver of claim 3, wherein modifying the first gamma parameter set is based on an application command received from a controller external to the display driver.

5. The display driver of claim 1, wherein the image processing circuitry is further configured to modify the second gamma parameter set in response to an application command received from a controller external to the display driver.

6. The display driver of claim 1, wherein generating the first voltage data is based on first image data for the first pixel in the first screen area, and wherein generating the second voltage data is based on second image data for the second pixel in the second screen area.

7. The display driver of claim 6, further comprising:

a memory configured to store application image data; and a selector configured to supply corresponding image data of the stored application image data as the second image data in response to an application command received from a controller external to the display driver, the corresponding image data corresponding to the second pixel.

8. The display driver of claim 7, wherein the image processing circuitry is further configured to modify the second gamma parameter set in response to the application command.

9. The display driver of claim 1, wherein the display panel is foldable at the connection area, and wherein modifying the width of the connection area is based on an angle between the first screen area and the second screen area.

10. The display driver of claim 1, wherein the display panel is foldable at the connection area, and wherein the image processing circuitry is further configured to modify the first gamma parameter set based on an angle between the first screen area and the second screen area.

11. A display device, comprising:

a display panel comprising:

a first screen area;

a second screen area; and a connection area disposed between the first screen area and the second screen area; and a display driver configured to:

modify a width of the connection area between the first screen area and the second screen area;

generate first voltage data for a first pixel in the first screen area using a first gamma parameter set that defines a first gamma curve for the first screen area;

generate second voltage data for a second pixel in the second screen area using a second gamma parameter set that defines a second gamma curve for the second screen area;

determine an interpolated gamma parameter set for the connection area through interpolation between the first gamma parameter set and the second gamma parameter set;

generate third voltage data for a third pixel in the connection area using the interpolated gamma parameter set;

update the first pixel in the first screen area based on the first voltage data;

update the second pixel in the second screen area based on the second voltage data; and update the third pixel in the connection area based on the third voltage data.

12. The display device of claim 11, wherein the interpolation is based on a position of the third pixel in the display panel.

13. The display device of claim 11, wherein the display driver is further configured to generate the second gamma parameter set based on the first gamma parameter set.

14. The display device of claim 11, wherein the display panel is foldable at the connection area, and wherein modifying the width of the connection area is based on an angle between the first screen area and the second screen area.

15. A method, comprising:

modifying a width of a connection area between a first screen area and a second screen area of a display panel;

generating first voltage data for a first pixel in the first screen area of the display panel using a first gamma parameter set that defines a first gamma curve for the first screen area;

generating second voltage data for a second pixel in the second screen area of the display panel using a second gamma parameter set that defines a second gamma curve for the second screen area;

determining an interpolated gamma parameter set for the connection area of the display panel through interpolation between the first gamma parameter set and the second gamma parameter set, the connection area being disposed between the first screen area and the second screen area; and generating third voltage data for a third pixel in the connection area using the interpolated gamma parameter set; and updating the first pixel in the first screen area based on the first voltage data;

updating the second pixel in the second screen area based on the second voltage data; and updating the third pixel in the connection area based on the third voltage data.

* * * * *